(12) United States Patent
Esswie

(10) Patent No.: US 12,335,782 B2
(45) Date of Patent: Jun. 17, 2025

(54) LATENCY AND RELIABILITY IMPROVEMENTS FOR SIDELINK SERVICE

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 288 days.

(21) Appl. No.: 17/866,298

(22) Filed: Jul. 15, 2022

(65) Prior Publication Data
US 2024/0022964 A1    Jan. 18, 2024

(51) Int. Cl.
   *H04W 28/08*      (2023.01)
   *H04W 28/02*      (2009.01)
              (Continued)

(52) U.S. Cl.
   CPC ... *H04W 28/0967* (2020.05); *H04W 28/0268* (2013.01); *H04W 72/121* (2013.01); *H04W 72/542* (2023.01); *H04W 76/28* (2018.02)

(58) Field of Classification Search
   CPC ......... H04W 28/0967; H04W 28/0268; H04W 72/121; H04W 72/542; H04W 76/28;
               (Continued)

(56) References Cited

U.S. PATENT DOCUMENTS

2013/0176920 A1    7/2013   Seo et al.
2019/0174503 A1    6/2019   Adachi et al.
(Continued)

FOREIGN PATENT DOCUMENTS

EP      4224946 A1 *   8/2023   ............. H04W 4/40

OTHER PUBLICATIONS

Technical specifications (TS) 38.201—"5G; NR; Physical layer; General description", 3GPP TS 38.201 version 15.0.0 Release 15, Sep. 2018, 14 pages.
(Continued)

*Primary Examiner* — Ricky Q Ngo
*Assistant Examiner* — David M Kayal
(74) *Attorney, Agent, or Firm* — Amin, Turocy & Watson, LLP

(57) ABSTRACT

A RAN configures user equipment members of a sidelink group with mapping of a criterion to various quality of service violation levels associated with a data traffic flow. A violation level indicates how close a member is to violating a quality-of-service limit such as a latency limit. Members analyze a parameter measurement such as latency relative to the criterion, determine respective violation levels, and share, in an SCI, the respective violation levels with each other. A member having a higher violation level than another may preempt resources currently granted to the other. The preempting device may transmit an indication of the resource preemption. Sharing of the respective violation levels may occur during a configured sidelink-group-common DRX active period that is different from a device-specific DRX active period. A sidelink search space may be used to indicate, with an SCI, traffic destined to a member in a configured grant-free resource.

20 Claims, 17 Drawing Sheets

(51) Int. Cl.
   *H04W 72/121* (2023.01)
   *H04W 72/542* (2023.01)
   *H04W 76/28* (2018.01)

(58) Field of Classification Search
   CPC ..... H04W 72/02; H04W 72/25; H04W 76/14;
   H04W 72/00; H04W 72/20; H04W 72/40;
   H04W 92/18; H04W 72/23; H04W
   28/0875
   See application file for complete search history.

(56) References Cited

U.S. PATENT DOCUMENTS

| | | | |
|---|---|---|---|
| 2022/0022228 A1 | 1/2022 | Wang et al. | |
| 2022/0159674 A1* | 5/2022 | Deng | H04W 72/566 |
| 2022/0377821 A1* | 11/2022 | Antonioli | H04W 76/14 |
| 2023/0063472 A1* | 3/2023 | Freda | H04W 76/28 |
| 2024/0057068 A1 | 2/2024 | Esswie | |
| 2024/0284336 A1* | 8/2024 | Yang | H04W 52/0235 |
| 2024/0314085 A1* | 9/2024 | Loehr | H04L 47/24 |

OTHER PUBLICATIONS

Technical specifications (TS) 38.331—"SG; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"SG; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

Office Action mailed Oct. 30, 2024 for U.S. Appl. No. 17/887,373, 29 pages.

Notice of Allowance mailed Mar. 4, 2025 for U.S. Appl. No. 17/887,373, 29 pages.

* cited by examiner

FIG. 3

Example of proposed stage-3 contents of sidelink QoS violation mapping configurations.

| Sidelink latency KPI range | Corresponding QoS violation level |
|---|---|
| KPI > Xxx_1 | Level 1 : far away from QoS violation |
| Xxx_1 > KPI > Xxx_2 | Level 2 : less far away from QoS violation |
| .. | .. |
| KPI < Xxx_n | Level n : close to QoS violation |

Xxx_1 > Xxx_2 > ... > Xxx_n

305

310

300

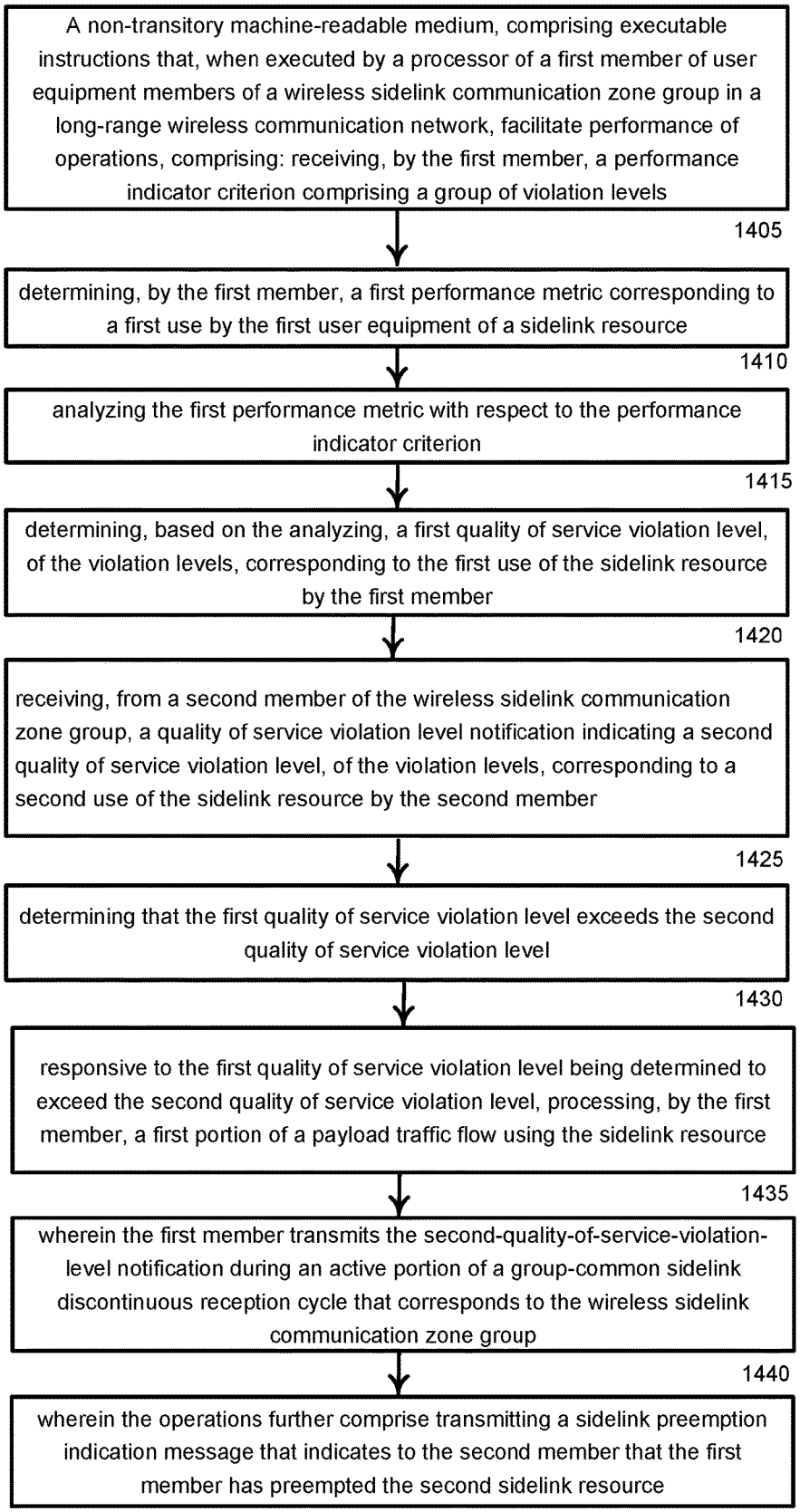

FIG. 15

```
┌─────────────────────────────────────────────────────────────┐
│ A method, comprising: receiving, by a first user equipment  │
│ of user equipment of a wireless sidelink communication zone │
│ group in a long-range wireless communication network,       │
│ semi-static sidelink data resource configuration            │
│ information that configures the first user equipment to     │
│ obtain data from a semi-static sidelink data resource       │
└─────────────────────────────────────────────────────────────┘
                              │ 1505
                              ▼
┌─────────────────────────────────────────────────────────────┐
│ monitoring the semi-static sidelink data resource according │
│ to the configured semi-static sidelink data resource        │
│ configuration information                                    │
└─────────────────────────────────────────────────────────────┘
                              │ 1510
                              ▼
┌─────────────────────────────────────────────────────────────┐
│ decoding the semi-static sidelink data resource according   │
│ to the configured semi-static sidelink data resource        │
│ configuration information to result in a decoded            │
│ semi-static sidelink data resource                           │
└─────────────────────────────────────────────────────────────┘
                              │ 1515
                              ▼
┌─────────────────────────────────────────────────────────────┐
│ determining that the decoded semi-static sidelink data      │
│ resource comprises a portion of a payload traffic flow      │
│ destined for the first user equipment                        │
└─────────────────────────────────────────────────────────────┘
                              │ 1520
                              ▼
┌─────────────────────────────────────────────────────────────┐
│ retrieving the portion of a payload traffic flow destined   │
│ from the decoded semi-static sidelink data resource          │
└─────────────────────────────────────────────────────────────┘
                              │ 1525
                              ▼
┌─────────────────────────────────────────────────────────────┐
│ processing, by the first user equipment, the portion of     │
│ the payload traffic destined for the first user equipment   │
└─────────────────────────────────────────────────────────────┘
                              │ 1530
                              ▼
┌─────────────────────────────────────────────────────────────┐
│ wherein the semi-static sidelink data resource configuration│
│ information comprises a device-specific scrambling code for │
│ use by the first user equipment to decode the semi-static   │
│ sidelink data resource                                       │
└─────────────────────────────────────────────────────────────┘
                              │ 1535
                              ▼
┌─────────────────────────────────────────────────────────────┐
│ wherein the device-specific scrambling code comprises an    │
│ orthogonal transmission scrambling code                      │
└─────────────────────────────────────────────────────────────┘
                              │ 1540
```

1500

LATENCY AND RELIABILITY IMPROVEMENTS FOR SIDELINK SERVICE

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. In scenarios where user equipment are beyond RAN coverage, the RAN nodes may control how sidelink resources are dynamically reserved and released for each device to prevent more than one user equipment of a sidelink group transmitting simultaneously on partially or fully overlapping sidelink resource to avoid transmission collision.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises receiving, by a first user equipment of user equipment of a wireless sidelink communication zone group in a long-range wireless communication network, a performance indicator criterion defined with respect to quality of service violation levels. The criterion may comprise a parameter such as latency or reliability. The example method comprises determining, by the first user equipment, a first performance metric, such as a measured latency, corresponding to a first use of a first sidelink resource by the first user equipment; analyzing the first performance metric with respect to the performance indicator criterion; determining, based on the analyzing, a first quality of service violation level, of the violation levels, corresponding to the first use of the first sidelink resource by the first user equipment; receiving, from a second user equipment of the wireless sidelink communication zone group, a quality of service violation level notification indicating a second quality of service violation level of the violation levels corresponding to a second use of a second sidelink resource by the second user equipment; determining that the first quality of service violation level exceeds the second quality of service violation level; responsive to the first quality of service violation level being determined to exceed the second quality of service violation level, processing, by the first user equipment, a portion of a payload traffic flow using the second sidelink resource. In an embodiment, the first sidelink resource and the second sidelink resource comprise the same sidelink resource. The second use by the second UE could be the transmitting a lower priority traffic flow (e.g., traffic having a higher tolerance for latency), which would tend to result in a lower QoS violation level, or the second use by the second UE could actually be the transmitting traffic of a higher priority that the first use by the first UE, but the second UE may have much less resource congestion for transmitting its respective traffic flow that congestion experienced by the first UE, thus still tending to result in a lower QoS violation level for the second use. The first and second resources may be the same resource being used for the first and second uses, or the first and second resources may be different resources being used for the first and second uses, respectively.

In an embodiment, the first user equipment may transmit the second-quality-of-service-violation-level notification during an active portion of a group-common sidelink discontinuous reception cycle that corresponds to the wireless sidelink communication zone group. The group-common DRX cycle may be configured in sidelink UEs with configuration information that may include: frequency and timing resources, DRX active time, DRX inactive time, DRX cycle periodicity; or scrambling codes associated with the respective group-common DRX cycle resources. In an example embodiment, a group-common sidelink discontinuous reception cycle configuration that corresponds to the group-common sidelink discontinuous reception cycle may comprise service-specific scrambling codes associated with group-common sidelink discontinuous reception cycle resources that are service-specific, and wherein the service-specific scrambling codes are used to encode the second-quality-of-service-level notification. In an example embodiment, a group-common sidelink discontinuous reception cycle configuration that corresponds to the group-common sidelink discontinuous reception cycle may comprise device-specific scrambling codes associated with group-common sidelink discontinuous reception cycle resources that are device-specific, and wherein the device-specific scrambling codes are used to encode the second-quality-of-service-violation-level notification.

The example method may further comprise transmitting a sidelink preemption indication message that indicates to the second user equipment that the first user equipment has preempted the second sidelink resource. The sidelink preemption message may be scrambled according to a device-specific scrambling code corresponding to the second user equipment. The sidelink preemption message is scrambled according to a scrambling code corresponding to the wireless sidelink communication zone group.

An example embodiment may comprise transmitting to a third user equipment a portion of a payload traffic flow in a third sidelink resource, which may be a configured, grant-free resource. The embodiment may further comprise transmitting to the third user equipment in a sidelink search space a sidelink activation message comprising an indication of the third sidelink resource containing traffic intended for, or destined for, the third user equipment.

In another example embodiment, a user equipment may comprise a processor configured to receive, by a first user equipment of user equipment that are members of a wireless sidelink communication zone group in a long-range wireless communication network, a performance indicator criterion based on different violation levels; determine, by the first user equipment, a first performance metric corresponding to a first use, by the first user equipment, of a first sidelink resource; analyze the first performance metric with respect to the performance indicator criterion; determine, based on the analyzing, a first quality of service violation level, of the violation levels, corresponding to the first use of the first sidelink resource by the first member; receive, from a second user equipment of the wireless sidelink communication zone group, a quality of service violation level notification indicating a second quality of service violation level, of the violation levels, corresponding to a second use of a second sidelink resource by the second user equipment; determine that the first quality of service violation level exceeds the second quality of service violation level; responsive to the first quality of service violation level being determined to exceed the second quality of service violation level, process, by the first user equipment, a portion of a payload traffic flow using the second sidelink resource. The first sidelink resource and the second sidelink resource may comprise the same sidelink resource or may comprise different resources.

In an example embodiment, the first user equipment may transmit the second-quality-of-service-violation-level notification during an active portion of a group-common sidelink discontinuous reception cycle that corresponds to the wireless sidelink communication zone group. In an embodiment a group-common sidelink discontinuous reception cycle configuration that corresponds to the group-common sidelink discontinuous reception cycle may comprise service-specific scrambling codes associated with group-common sidelink discontinuous reception cycle resources that are service-specific, and wherein the service-specific scrambling codes are used to encode the second-quality-of-service-level notification. In another embodiment a group-common sidelink discontinuous reception cycle configuration that corresponds to the group-common sidelink discontinuous reception cycle may comprise device-specific scrambling codes associated with group-common sidelink discontinuous reception cycle resources that are device-specific, and wherein the device-specific scrambling codes are used to encode the second-quality-of-service-violation-level notification. In an embodiment the processor may be further configured to transmit a sidelink preemption indication message that indicates to the second user equipment that the first user equipment has preempted the second sidelink resource.

In an embodiment, the processor may be configured to monitor a sidelink search space, wherein the sidelink search space may comprise a sidelink activation message transmitted from a third user equipment, wherein the sidelink activation message may comprise an indication of a configured third sidelink resource containing data traffic intended for the first user equipment; decode, by the first user equipment, the sidelink search space to result in a decoded indication of the third sidelink resource; and process, by the first user equipment, a portion of a payload traffic flow from the third sidelink resource. The third resource may comprise a grant-free resource that the first UE may have been configured by a RAN node to monitor. The search space may be configured in the first UE by a RAN node. The search space may be configured in the first UE by information received in an SCI received from a sidelink UE.

In another embodiment, a non-transitory machine-readable medium, may comprise executable instructions that, when executed by a processor of a first member of user equipment members of a wireless sidelink communication zone group in a long-range wireless communication network, facilitate performance of operations, comprising: receiving, by the first member, a performance indicator criterion comprising a group of violation levels; determining, by the first member, a first performance metric corresponding to a first use by the first user equipment of a sidelink resource; analyzing the first performance metric with respect to the performance indicator criterion; determining, based on the analyzing, a first quality of service violation level, of the violation levels, corresponding to the first use of the sidelink resource by the first member; receiving, from a second member of the wireless sidelink communication zone group, a quality of service violation level notification indicating a second quality of service violation level, of the violation levels, corresponding to a second use of the sidelink resource by the second member; determining that the first quality of service violation level exceeds the second quality of service violation level; and responsive to the first quality of service violation level being determined to exceed the second quality of service violation level, processing, by the first member, a portion of a first payload traffic flow using the sidelink resource. The first member may transmit the second-quality-of-service-violation-level notification during an active portion of a group-common sidelink discontinuous reception cycle that corresponds to the wireless sidelink communication zone group. The operations may further comprise transmitting a sidelink preemption indication message that indicates to the second member that the first member has preempted the second sidelink resource.

In an embodiment, a non-transitory machine-readable medium may comprise executable instructions that, when executed by a processor of a first member of user equipment members of a wireless sidelink communication zone group in a long-range wireless communication network, facilitate performance of operations, the operations may comprise: monitoring a sidelink search space, wherein the sidelink search space comprises a sidelink activation message transmitted by a third member of the wireless sidelink communication zone group, the sidelink activation message comprising an indication of a third sidelink resource carrying data traffic of a second payload traffic flow destined for the first member; decoding, by the first member, the sidelink search space to result in a decoded indication of the third sidelink resource; and processing, by the first member, a portion of the second payload traffic flow according to the decoded indication of the third sidelink resource. The third resource may be a configured, grant-free resource occasion configured by a RAN node in the first UE. The search space indication may comprise an SCI transmitted from the third UE.

In an example embodiment, a method comprises receiving, by a first user equipment of user equipment of a wireless sidelink communication zone group in a long-range wireless communication network, semi-static sidelink data resource configuration information that configures the first user equipment to obtain data from a semi-static sidelink data resource. The example embodiment may further comprise monitoring the semi-static sidelink data resource according to the configured semi-static sidelink data resource configuration information; decoding the semi-static sidelink data resource according to the configured semi-static sidelink data resource configuration information to result in a decoded semi-static sidelink data resource; determining that the decoded semi-static sidelink data resource comprises a portion of a payload traffic flow destined for the first user equipment; retrieving the portion of a payload traffic flow destined from the decoded semi-static sidelink data resource; and processing, by the first user equipment, the portion of the payload traffic destined for the first user equipment.

The semi-static sidelink data resource configuration information may include timing resource information (when to monitor), frequency resource information (spectrum or part of spectrum to monitor), and periodicity information that define how to monitor one or more occasions of the semi-static sidelink data resource. The semi-static sidelink data resource configuration information may comprise a device-specific scrambling code for use by the first user equipment to decode the semi-static sidelink data resource. The device-specific scrambling code may comprise an orthogonal transmission scrambling code.

The example embodiment may further comprise receiving sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; monitoring the sidelink search space according to the configured sidelink search space configuration information; decoding the sidelink search space according to the configured sidelink search space configuration information to result in a decoded sidelink search space; determining that the decoded sidelink search space comprises a semi-static sidelink data resource activation indication indicating that the semi-static sidelink data resource comprises a portion of a payload traffic flow destined for the first user equipment; monitoring the semi-static sidelink data resource according to the configured semi-static sidelink data resource configuration information; decoding the semi-static sidelink data resource according to the configured semi-static sidelink data resource configuration information to result in a decoded semi-static sidelink data resource; determining that the decoded semi-static sidelink data resource comprises a portion of a payload traffic flow destined for the first user equipment; retrieving the portion of a payload traffic flow destined from the decoded semi-static sidelink data resource; and processing, by the first user equipment, the portion of the payload traffic destined for the first user equipment.

The example embodiment may further comprise receiving sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; monitoring the sidelink search space according to the configured sidelink search space configuration information; decoding the sidelink search space according to the configured sidelink search space configuration information to result in a decoded sidelink search space; determining that the decoded sidelink search space comprises a semi-static sidelink data resource activation indication indicating that the semi-static sidelink data resource does not comprise a portion of a payload traffic flow destined for the first user equipment; and skipping monitoring of a next-occurring semi-static sidelink data resource occasion. The semi-static sidelink data resource activation indication may be a sidelink control information. The decoding of the sidelink search space may comprise blind decoding.

In another example embodiment, a method may comprise transmitting, to a first user equipment of user equipment of a wireless sidelink communication zone group in a long-range wireless communication network, semi-static sidelink data resource configuration information that configures the first user equipment to obtain data from a semi-static sidelink data resource; receiving a portion of a payload traffic flow destined for the first user equipment; and transmitting the portion of the payload traffic flow destined for the first user equipment in an occasion of the semi-static sidelink data resource. The example embodiment method may further comprise scrambling the portion of the payload traffic flow destined for the first user equipment in the occasion of the semi-static sidelink data resource according to a code specific to the first user equipment.

The example embodiment may further comprise transmitting sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; scrambling the semi-static sidelink data resource activation indication according to a code specific to the first user equipment to result in a scrambled semi-static sidelink data resource activation indication; and transmitting the scrambled semi-static sidelink data resource activation indication in the sidelink search space, wherein the sidelink search space is transmitted before, and corresponds to, the semi-static sidelink data resource occasion in which the portion of the payload traffic flow destined for the first user equipment is transmitted. The sidelink search space is transmitted as a sidelink control information. The sidelink search space comprises a shorter duration than the semi-static sidelink data resource occasion. The sidelink search space is transmitted using a smaller frequency spectrum range than the transmitting of the occasion of the semi-static sidelink data resource.

In an example embodiment a non-transitory machine-readable medium, may comprise executable instructions that, when executed by a processor of a second member of user equipment members of a wireless sidelink communication zone group in a long-range wireless communication network, facilitate performance of operations, comprising: transmitting, to a first user equipment of the user equipment of the wireless sidelink communication zone group, semi-static sidelink data resource configuration information that configures the first user equipment to obtain data from a semi-static sidelink data resource; receiving a portion of a payload traffic flow destined for the first user equipment; and transmitting the portion of the payload traffic flow destined for the first user equipment in an occasion of the semi-static sidelink data resource. The operations further comprise scrambling the portion of the payload traffic flow destined for the first user equipment in the occasion of the semi-static sidelink data resource according to a code specific to the first user equipment.

In the example embodiment non-transitory machine-readable medium the operations further comprise: transmitting sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; scrambling the semi-static sidelink data resource activation indication according to a code specific to the first user equipment to result in a scrambled semi-static sidelink data resource activation indication; and transmitting the scrambled semi-static sidelink data resource activation indication in the sidelink search space, wherein the sidelink search space is transmitted before, and corresponds to, the semi-static sidelink data resource occasion in which the portion of the payload traffic flow destined for the first user equipment is transmitted. The sidelink search space comprises a shorter duration than the semi-static sidelink data resource occasion. The sidelink search space is transmitted using a smaller frequency spectrum range than the transmitting of the occasion of the semi-static sidelink data resource.

BRIEF DESCRIPTION OF THE DRAWINGS

FIG. 3 illustrates a mapping of KPI metric criteria to one or more defined QoS violation levels.

FIG. 14 illustrates a block diagram of an example non-transitory machine-readable medium embodiment.

FIG. 15 illustrates a block diagram of an example method.

DETAILED DESCRIPTION OF THE DRAWINGS

Figure 1:
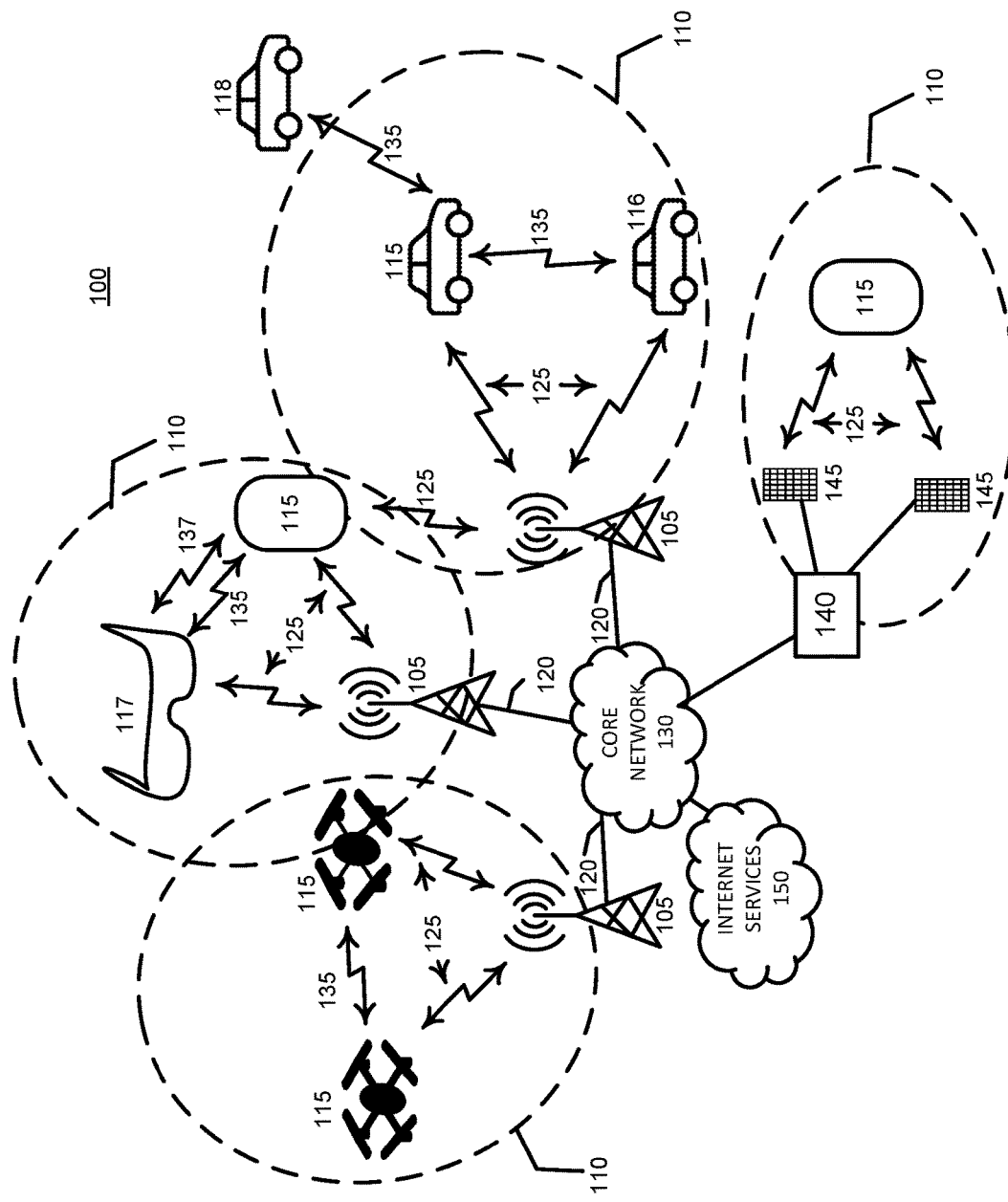
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI") and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device need only receive and blindly decode the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device needs to always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, and accordingly, sensing sidelink device need only monitor and blindly decode those timing and frequency instants while possibly deep sleeping otherwise.

Sidelink relays are sidelink devices that are performing sidelink and RAN functions on behalf of, or for the sake of, other remote sidelink devices in proximity to the sidelink relay. Sidelink relays offers a wide set of sidelink functions for remote sidelink devices including channel granting, multi-hop traffic relaying, or paging monitoring. Thus, less capable sidelink remote devices obtain several performance advantages such as power saving gains, and sidelink and RAN network coverage extension. Accordingly, there are two modes which a sidelink relay device may adopt for announcing their presence for remote devices in proximity. In one variant, sidelink relays explicitly announce their presence using a preconfigured discovery procedure. During the configured discovery period, sidelink relay broadcasts an announcement message that indicates their presence and their associated relaying configurations. Remote devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Sidelink discontinuous reception ("DRX") cycle and channel partial sensing partially address the issue of device battery consumption. A sidelink device is configured with a DRX cycle that consists of a period of monitoring control channels to determine if there is a scheduled sidelink reception, and a period of deep sleeping such that power consumption of the sidelink device is optimized. Unlike RAN DRX procedures, sidelink inter-device coordination procedures must be in place for sidelink DRX, due to the distributed nature of the sidelink interface. For example, a sidelink device my transmit a sidelink scheduling information towards another sidelink device in proximity that is currently deep sleeping, leading to the sleeping device missing the detection of the scheduling information, and accordingly, increasing the sidelink transmission latency. Thus, sidelink devices in proximity coordinate on DRX cycles that are common at least between device pairs of interest.

Regarding partial channel sensing, sidelink devices implementing continuous channel sensing need to always monitor sidelink control channels for potential scheduled transmissions, which results in significant battery power consumption due to the frequent blind decoding attempts. With partial channel sensing and sidelink DRX, the scheduling of the control channel is preconfigured during certain periodic occasion that sidelink devices expect to perform channel sensing. Thus, partial channel sensing enables sidelink devices to deep sleep over extended periods of time, even during a sidelink DRX channel wake period.

However, due to the functionality that the sidelink relays perform, power consumption is exacerbated for sidelink relays compared to non-relay sidelink UEs. That is, a sidelink relay needs to perform RAN-like procedures as well as sidelink functions for the relay device itself and its connected remote sidelink devices, leading to significant battery consumption. A sidelink relay relays traffic and performs RAN/sidelink functions on behalf of the connected remote sidelink devices. A sidelink relay may monitor and decode RAN/sidelink paging on behalf of remote devices. The higher the number of remote devices that are connected to the relay as part of a sidelink group, or zone, the more the number of paging occasions the sidelink relay monitors, detects, and decodes, which consumes battery power of the sidelink relay at a high rate. In addition, a sidelink relay may perform sidelink routing and relaying of traffic towards not-in-RAN-coverage sidelink devices. A sidelink relay device may also perform continuous and/or partial channel sensing on behalf of connected in-coverage remote sidelink devices. Such upgraded, or additional, functionality of sidelink relay devices introduces a power consumption limitation at the device end. Thus, power saving optimization procedures are desirable to enhance battery charge/energy availability at battery powered sidelink relays.

Moreover, the nature of the sidelink interface may be distributed with various device capabilities. Hence, some sidelink devices may be able to sense the sidelink channel continuously or partially while others may be sensing-non-capable devices. As all types of sidelink devices are required to coexist within the same configured sidelink resources, existing channel allocation and prioritization procedures (e.g., sidelink channel preemption procedures), fail to guarantee low latency and reliable sidelink communications. For instance, when some of the existing sidelink devices are not capable of, are not configured for, or do not perform channel sensing, current preemption procedures do not allow higher priority sidelink devices to instantly take over occupied resources, by sending preemption indication, since some devices in proximity may not be performing channel, and accordingly, may skip detecting such preemption indication, and thus may introduce channel collisions to critical sidelink transmissions.

Accordingly, it is desirable to optimize latency performance and reliability of the sidelink communications when channel sensing capable and channel-sensing-non-capable sidelink devices coexist with each other on the same sidelink spectrum. In such deployments, existing sidelink channel allocation and prioritization procedures do not guarantee fast and reliable sidelink transmissions due to the key assumption that sidelink devices in proximity must be able to sense the sidelink channel allocation messages fully or partially, which is not applicable in many sidelink deployments. Thus, solutions for improving sidelink channel reliability and latency in multi-device multi-capability sidelink deployments are desirable.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB s)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Disclosed herein are several example embodiments, aspects, features, or concepts for enhancing reliability and latency performance of a sidelink interface used by a group of user equipment members that may have differing design capabilities, or may deployed for different purposes, and thus may be configured for different operation that other members of the group. For example, some members of a sidelink group may be configured to sense sidelink control channel occasions and some members may not be configured to sense sidelink control channel occasions. The latter may be referred to as non-capable or non-sensing-capable, or similar designation.

In an embodiment, real-time sidelink QoS violation adaptation may facilitate user equipment members of a sidelink group being associated with different latency and reliability targets associated with the same sidelink service obtaining sidelink resources based on various quality of service (QoS) violation levels. A QoS violation level may refer to a remaining latency and/or reliability tolerance, or 'headroom', until a per-packet performance QoS target, or criterion, is exceeded.

Existing channel prioritization procedures treat differences in QoS violation levels equally. For example, an existing sidelink interface may allocate sidelink channel resources with a similar priority to multiple sidelink devices using a given sidelink service, thus, traffic for each sidelink device may be deemed as being associated with the same traffic priority indication regardless of whether one or more of devices associated with the sidelink service may be approaching its respective QoS violation point, or criterion, more than another device of the sidelink group.

A real-time Sidelink QoS Violation Adaptation embodiment introduce a real-time QoS-violation-aware sidelink channel allocation. Sidelink channel resources are typically limited by nature (e.g., there is more demand for sidelink resources than capacity). The disclosed real-time sidelink QoS violation adaptation embodiment facilitates efficient and dynamic utilization of sidelink resources such that packets of sidelink traffic with the most stringent QoS violation budget are prioritized for expedited sidelink transmission, even relative to packets corresponding to other sidelink devices carrying critical, similar-priority traffic, or even higher-priority traffic, and/or that may be using a similar sidelink service, but that are not currently operating with as high a violation level as a device given higher priority. The real-time sidelink QoS violation adaptation embodiment introduces novel device-to-device signaling procedures, new information elements exchange, and new procedures for how to consistently capture real-time QoS violation across multiple sidelink devices.

Real-time QoS-violation-aware sidelink adaptation may implement resource preemption and allocation. The limited sidelink resources being used for one traffic flow associated with one device can be preempted and used for a different traffic flow associated with a different device. Thus, sidelink resources allocated for a given traffic flow can be 'overtaken' in real-time and used a traffic flow that is approaching its latency QoS violation level. (Contrast with existing sidelink preemption procedures that only differentiate sidelink devices, on a non-real-time basis, based on utilizing different sidelink services—in cases where devices are carrying similar critical sidelink services but with various QoS and latency budgets, existing procedures treat sidelink devices equally with respect to channel scheduling and allocation, which can lead to violating QoS targets of devices corresponding to the higher QoS levels.)

Real-time sidelink QoS violation adaptation facilitates real-time sidelink channel resource preemption and sharing to sidelink devices which are critical insofar as that may be approaching their QoS violation point. ('Real-time' may refer to resources not being assigned just based on a static traffic type, but instead based not only on traffic type but also on changing sidelink conditions at a given sidelink device or among members of a sidelink group of devices). A RAN node, a sidelink relay, or sidelink service providers may transmit configurations to sidelink UEs facilitate real time QoS violation adaptation. The configuration information may include sidelink key performance indicators ("KPI") of interest and their mapping to a predefined set of QoS violation levels.

Figure 2:
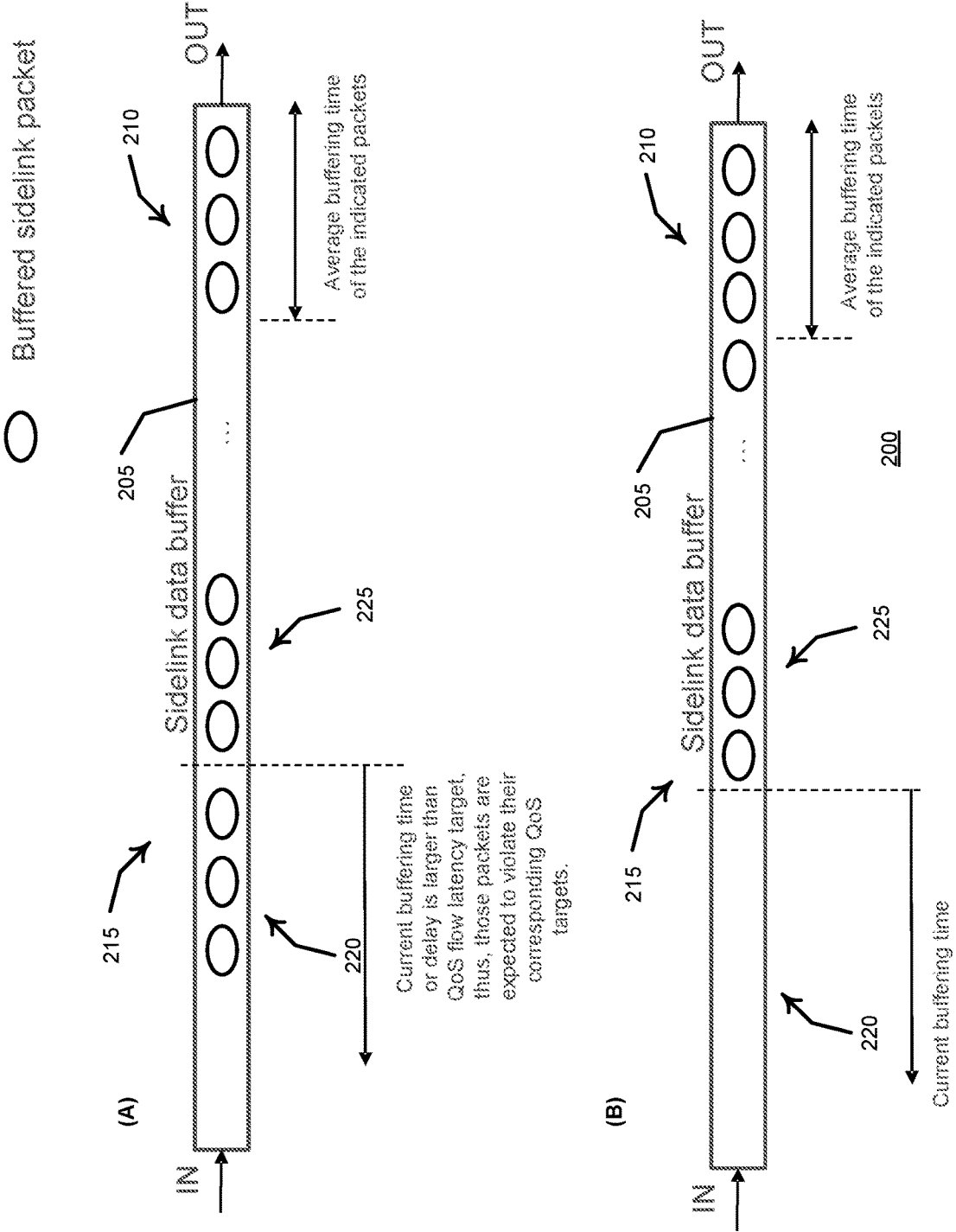
FIG. 2 illustrates buffering latency in a sidelink.

FIG. 2 illustrates buffering latency in a sidelink of interest, where buffering latency is time spent by each sidelink payload packet in a device's sidelink scheduling buffer. Each sidelink payload packet may be associated with a target latency budget for being successfully received at an intended receiving sidelink UE, and if the associated latency budget/criterion, is not fulfilled, or met, a sidelink outage may occur (e.g., after the latency criterion is violated, or not met, the packet becomes not important anymore). Thus, the QoS violation level indication may imply, or indicate, a level of remaining latency (or headroom) before a per-packet or a per-flow QoS violation occurs (e.g., the lower the amount of remaining headroom the higher the violation level). In example (A) shown in FIG. 2, an average packet buffer latency correlates with three packets 210 buffered in sidelink buffer 205. The average may be assumed as the latency criteria for purposes of discussion. If buffer 205 buffers six packets 215 of a traffic flow, then packets 225 can be delivered within the target latency budget correlating to the three-packet criterion, but packets 220 would remain in buffer 205 longer than the latency target/criterion and thus would result in a latency violation (e.g., the latency criteria is three packets buffered and the buffer time equates to six packets 220 buffered). In example (B), the average latency, which may be a latency criterion, is four packets 210 buffered in buffer 205. Three packets 225 are buffered, and zero packets 220 are buffered beyond the latency limit. Thus, a traffic flow corresponding to packets 215 in example (B) has not violated the example latency criterion but is one packet away, or the amount of extra time delay that would cause four packets to be buffered instead of three, away from reaching the latency criterion/limit of an amount of time it takes for four packets to exit buffer 205.

Turning now to FIG. 3, the figure illustrates a mapping 300 of KPI values, or metric criteria, 305 to one or more defined QoS violation levels 310. Different mappings 300 may be configured in members of a sidelink group. As shown in FIG. 3, higher/larger QoS violation levels 310 correspond to more latency stringency and tighter latency budgets (e.g., less latency headroom remaining before declaring a QoS violation of the sidelink device). A given mapping 300 that is configured into a sidelink device may be based on a quality or service level associated with a current traffic flow the sidelink device is processing, or transmitting, to another sidelink group member. Thus, different sidelink UEs of a given sidelink group may have different mappings 300 based on a quality of service, or qualities of service, corresponding to one or more traffic flows that the UEs are processing. Furthermore, a given sidelink UE may be processing packets of a first traffic flow associated with a first QoS and a second sidelink UE may be processing packets of a second traffic flow that is associated with a second QoS that is lower (e.g., less latency sensitive/more latency tolerant) than the first QoS but the second device can nevertheless determine a higher QoS violation level for itself, based on its specific mapping 300 and a current KPI associated with the second UE, than a QoS violation level determined by the first UE based on the mapping 300 configured into the first device and a current KPI of the first device. As an example, the first UE may be carrying more latency stringent traffic than the second UE, thus a given amount of latency might map to a higher QoS violation level at the first UE than the second UE (e.g., ranges 305 that map to corresponding violation levels 310 may differ based on QoS levels associated with mappings 300 for the first and second UEs), but if the second UE is experiencing much more severe channel congestion than the first UE the second UE could nevertheless determine a higher QoS violation level because it may be closer to reaching a latency violation than is the first UE.

Sidelink devices of a sidelink group may continuously monitor and calculate their respective QoS violation levels, based on received QoS violation level-KPI mapping configurations 300. In an example embodiment, a sidelink device processing different sidelink flows that are associated with different latency budgets may consider the worst, or highest, QoS violation level for a buffered sidelink packet as its QoS violation level that it reports to other sidelink devices. A Sidelink device may share a calculated (e.g., determined by analyzing a measured metric corresponding to a KPI with respect to criterion 305 in mapping 300) QoS violation level indication 310, as part of first or second stage SCI messages, where a sidelink UE can schedule sidelink resources that were previously allocated and scheduled for a different sidelink device with a lower calculated QoS violation level indication. Thus, a UE member of a sidelink group approaching the highest QoS violation level of members of the sidelink group can take over additional sidelink resources immediately to fulfil and reset the UE's respective QoS violation level (e.g., using more resources to transmit buffered packets should result in a KPI measured after taking over the additional resources corresponding to a lower QoS violation level). When a UE member of a sidelink group receives a QoS violation notification via an SCI that another UE of the group has a higher QoS violation level, wherein the QoS violation indicated in the notification corresponds to a resource that partially or fully overlaps a resource assignment that the UE is currently using, the UE may stop, or halt, its respective preempted sidelink transmission over the overlapping resource(s) so as to avoid packet collision with latency stringent traffic associated with the higher QoS violation level indication.

Real-time sidelink QoS violation adaptation may facilitate multiple performance and sidelink flexibility advantages. For example, members of a sidelink group may be aware of actual and real time QoS violation levels of each member of the group, such that even sidelink devices of similar sidelink flows can be efficiently distinguished and prioritized depending on their actual QoS violation levels. In addition, in sidelink groups comprising sensing-capable and sensing-non-capable devices, channel resources may be allocated in random fashion to sensing-non-capable devices, since such members may not perform control channel sensing or may not detect higher priority transmissions. The non-sensing-capable devices may use the randomly assigned resources, while sidelink target latency and reliability may nevertheless be optimized via sensing-capable devices dynamically sharing their QoS violation levels and preempting sidelink resources as described above.

In an embodiment, a sidelink WTRU/UE member of a sidelink group may receive, from a RAN node and/or from sidelink relay(s), sidelink QoS adaptation configuration(s), which may include QoS mapping of KPIs of interest to QoS violation levels. On condition of sidelink resource congestion and/or full or part of a scheduled resources being preempted by higher-priority or random selection/allocation to non-sensing-capable devices, the sidelink UE member may determine a sidelink QoS violation level based on configured sidelink real-time latency KPIs, (e.g., a packet buffering latency the closest to a respective latency violation). The sidelink UE member may transmit a QoS violation level indication as part of a novel first-stage sidelink control information (SCI), and schedule and take over part of, or all of, a sidelink resource that is currently scheduled and reserved for one or more other sidelink members of the group that have determined a lower and/or smaller QoS violation level. The sidelink UE member that will be taking over the resource from the UE member having the lower QoS violation level may transmit a second-stage SCI, which may include transmission configurations, over the preempted resources to carry the critical sidelink traffic that was approaching a QoS violation point (as determined by having the higher QoS violation level). In an embodiment, the sidelink WTRU/UE member having the lower QoS violation level, upon receiving the QoS violation indication that another member of the group has determined that the other member will preempt resources, may stop and/or halt sidelink transmissions over indicated preempted resources.

Figure 4:
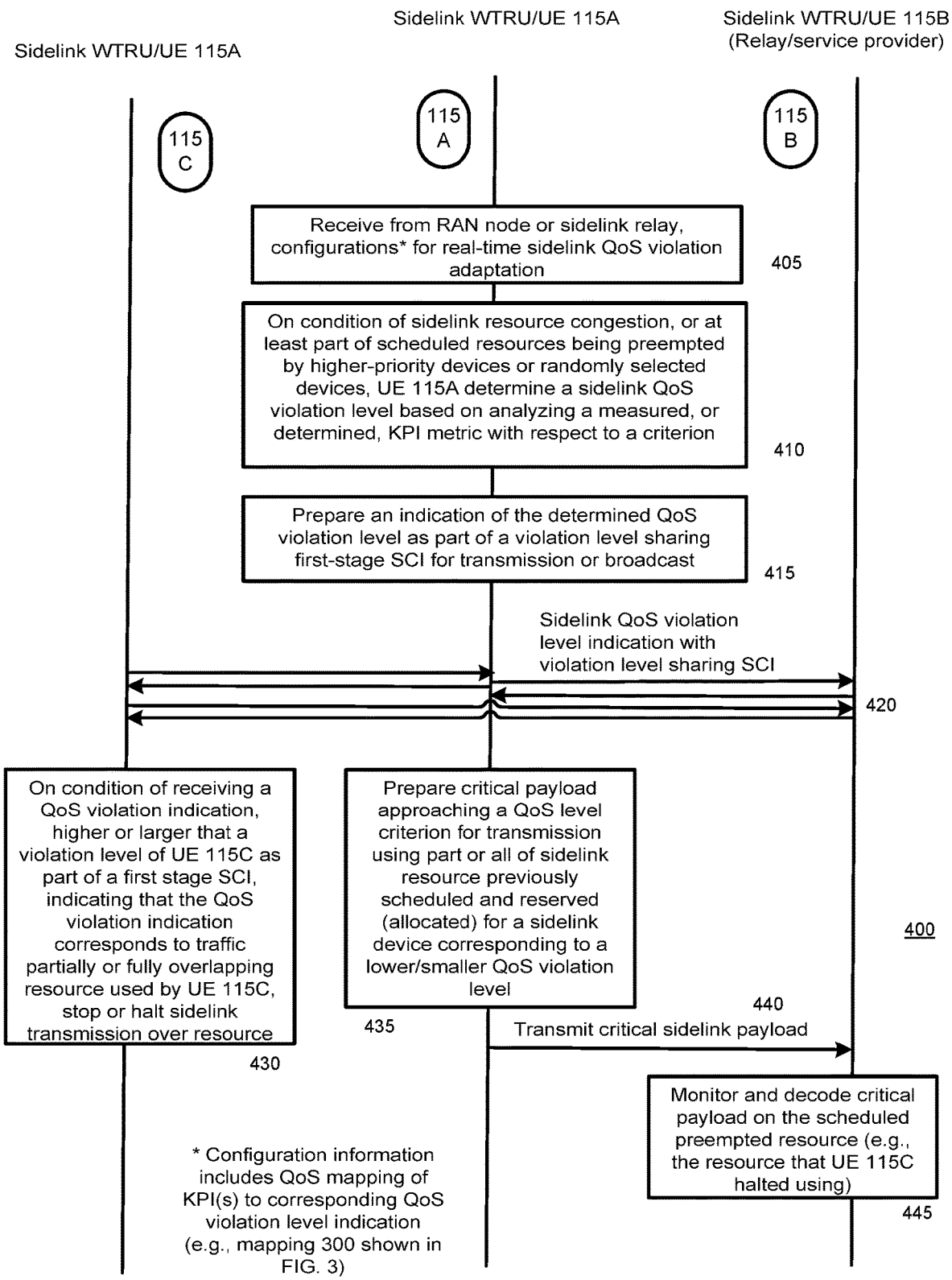
FIG. 4 illustrates a timing diagram of an example real-time sidelink QoS violation adaptation method.

Turning now to FIG. 4, the figure illustrates a timing diagram of an example real-time sidelink QoS violation adaptation method 400. UE 115A, UE 115B, and UE 115C, as well as other UEs, may be members of a sidelink group. At act 405, UE 115A receives from a RAN node or from sidelink relay UE 115B, a configuration for real-time sidelink QoS violation adaptation. The configuration may comprise a mapping of parameter values (e.g., criterion ranges) that correspond to respective violation levels. (It will be appreciated that UEs 115B and UE 115C may also receive configurations, but the configuration being provided to UE 115A may be specific to UE 115A and a traffic flow that UE 115A is processing for transmission.) At act 410, if UE 115A detects sidelink resource congestion, or that at least part of a scheduled sidelink resource is being preempted by another UE, or that part of a scheduled resource has been randomly assigned to another UE, for example a non-sensing-capable UE, UE 115A may determine a QoS violation level based on analyzing a KPI metric with respect to a QoS criterion. For example, if UE 115A has latency-sensitive/latency-stringent traffic to transmit to UE 115B, and UE 115A determines that a data channel scheduled for transmission of the traffic to UE 115B is constrained such that packets of the transmission are being buffered at UE 115A causing a measured latency that is approaching a violation limit associated with the traffic (e.g., latency of transmission of packets from UE 115A to UE 115B has almost reached a violation level indicating being close to a latency violation), UE 115A may, for example, determine a violation level by applying the measured latency amount (e.g., the KPI) to the violation levels 310 in mapping 300 to determine a QoS violation level 310 that corresponds to the measured latency.

At act 415, UE 115A may prepare a violation level indication of the QoS violation level determined at act 410 for transmission and may transmit the violation level indication in a violation level sharing first-stage SCI to UE 115C at act 420. It will be appreciated that UE 115B and UE 115C may also prepare respective violation level indications, based on their individual respective mapping 300, for transmission in a violation level sharing first stage SCI at act 415, but that act 415 is shown only for UE 115A for purposes of discussion. Act 420 is depicted with lines having arrows pointing from each UE 115 to the other UEs in the sidelink group to show that at act 420 the UEs of a sidelink group may share their respective violation level indications with each other. Thus, member devices of a sidelink group may be notified of violation levels of other members of the group.

At act 430, UE 115C may receive the first-stage SCI transmitted by UE 115A at act 420. After receiving the first-stage SCI, UE 115C may determine that an indication included in the violation level sharing first stage SCI indicates a violation level associated with a sidelink resource that UE 115C is scheduled to use, or that UE 115C may be using without being scheduled to use, that is higher than a violation level of a transmission that UE 115C may be performing using the same resource. If UE 115C makes such a determination that a violation level corresponding to the use that UE 115C is making of the resource is lower than the violation level received in the first-stage SCI transmitted by UE 115B at act 420, UE 115C may stop, or halt, using the resource.

At act 435, UE 115A may prepare the critical payload (e.g., packets that have been buffered at UE 115A an amount of time approaching a latency criterion associated with the packets) for transmission using the resource that UE 115C stopped, or halted, use of at act 430. At act 440 UE 115A may transmit buffered critical traffic payload packets to UE 115B using the resource that UE 115A 'overtook' from UE 115C based on the violation level at UE 115A corresponding to use of the sidelink resource for transmitting the buffered traffic packets being higher than the violation level for the same resource that UE 115C had been making use of before stopping, or halting, such use at act 430. UE 115B may monitor, decode, and process the traffic packets transmitted at act 440. (It will be appreciated that processing of the traffic packets at act 440 may comprise using the packets by an application at UE 115B, or processing may comprise forwarding/transmitting the packets to another member of the sidelink group.)

Figure 5:
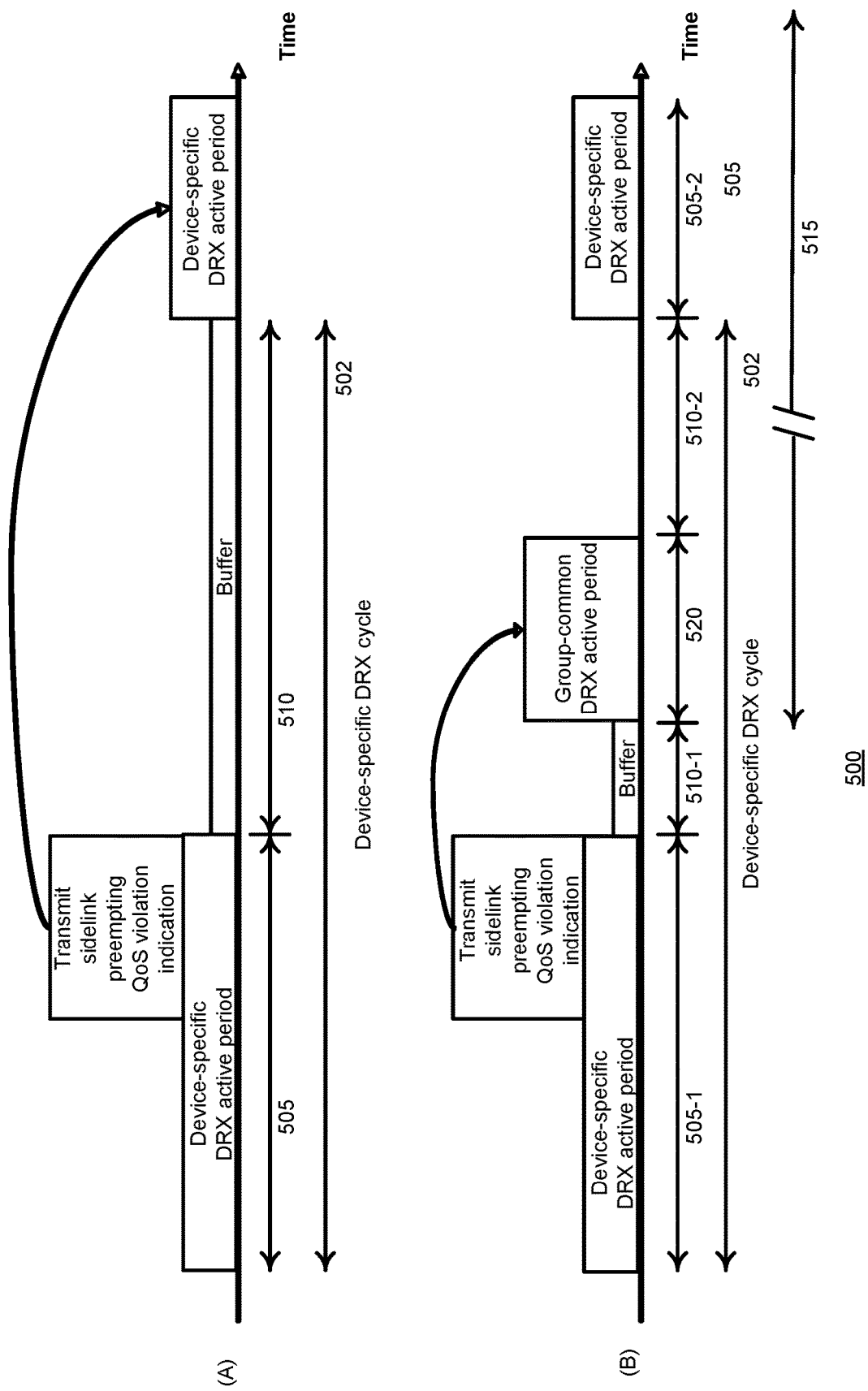
FIG. 5 illustrates a diagram of a device-specific discontinuous DRX cycle example embodiment.

Turning now to FIG. 5, the figure illustrates a diagram of a device-specific discontinuous DRX cycle embodiment 500. Example (A) shows a conventional device-specific DRX cycle 502 where a UE sidelink device has an active period 505 and an inactive period 510 during each configured DRX cycle 502. A device-specific DRX design facilitates power saving since sidelink devices can deep sleep during the DRX inactive periods 510 and only wake up and activate their RF chains during the DRX active period 505 to perform, among other actions, channel sensing and data reception. Thus, a sidelink UE, of a group of sidelink UEs which use a real time QoS violation adaptation feature as described above in reference to FIGS. 2-4, may only be able to transmit a latency stringent QoS violation level indication during device specific DRX active period 505 of the respective device. As depicted by example (A), this may lead to buffering latency during DRX inactive period 510 because a preempted resource cannot be efficiently overtaken (e.g., without possible collisions) before announcing the corresponding QoS violation indication, thus, potentially increasing end-to-end sidelink latency for latency-critical traffic.

As shown in example (B) in FIG. 5, a novel additional dynamic group-common DRX design may be used by multiple sidelink devices sharing a common interest of a given sidelink service set. For example, a group of sidelink devices, implementing sidelink autonomous driving sidelink services, can be associated with a DRX service-specific cycle 515 that is common to members of the group of autonomous driving sidelink devices. Thus, additional and per-device delay may be minimized for latency critical sidelink transmissions by the group members waking up for group-common DRX active period 520, of DRX group-common DRX cycle 515, and transmitting, or receiving, QoS violation level indications as described in reference to FIGS. 2-4, during the group-common DRX active period. When member devices of a sidelink group are configured to use group-common DRX active period 520, a wireless network and/or sidelink controllers may better manage sidelink interface latency for the latency-critical devices regardless of configured device-specific DRX cycles than if the sidelink group members are configured to only use a device-specific DRX for transmitting, or receiving, QoS violation indications.

Member devices of a sidelink group may be configured for use of a group-common DRX active period/group-common DRX cycle with group-common configuration information that may include: frequency and timing resources, DRX active time, DRX inactive time, DRX cycle periodicity; or scrambling codes associated with the respective group-common DRX cycle resources. The group common information that facilitates using group-common active period 520 may be service-specific or device-group-specific. For example, when a sidelink device is utilizing one or more services associated with a group-common DRX, the device may wake up, according to the group-common DRX cycle information, and monitor channel resources for potential service-specific scheduling and/or resource preemption.

In an embodiment from the perspective of a sidelink group WTRU/UE with traffic flow packets to transmit to another sidelink UE, a sidelink UE may receive from a RAN node and/or sidelink relay, sidelink configurations of a group-common sidelink DRX pattern/cycle, to carry QoS violation level indications. The group-common DRX pattern may comprise group-common DRX periodicity/cycle and frequency resources to monitor, device-group-common, service-specific, or device-specific scrambling codes to be used for transmitting the QoS violation indications during the configured group-common DRX active period. On condition of sidelink resource congestion and/or full or part of the UE's scheduled resources being preempted by higher-priority or random selection devices, the UE may transmit a QoS violation level indication, as part of a first-stage SCI, as described above in reference to FIGS. 2-4, during the nearest, or next, available DRX occasion of: the configured group-common DRX occasion 520 or a device-specific DRX occasion 505 of the receiving device. For example, if a sidelink UE determines a violation level during inactive period 510-1 the UE would transmit the violation olive indication during group common DRX active period 520, but if the UE determines a violation level indication during inactive period 510-2, then the UE may transmit the QoS violation level indication during device-specific DRX active period 505-2. The QoS violation level indication may be transmitted in an SCI to schedule or indicate taking over part of or all of a sidelink resources that currently scheduled and reserved for a sidelink devices of a lower and/or smaller QoS violation level. The preempting UE may transmit a second-stage SCI, including transmission configurations over the indicated preempted resources, to carry the critical sidelink traffic approaching its QoS violation point In an embodiment from the perspective of a sidelink group WTRU/UE with traffic flow packets that may be preempted, the sidelink UE may receive, from a RAN node and/or sidelink relays, sidelink configurations of a group-common sidelink DRX pattern, to carry QoS violation level indications, including group-common DRX periodicity/cycle and frequency resources to monitor, device-group-common, service-specific, or device-specific scrambling codes to be used for transmitting the QoS violation indications during the configured group-common DRX active cycle. On condition of utilizing or establishing a sidelink session for one or more sidelink services associated with the group-common DRX cycle/pattern and/or being configured with a sidelink group identifier that belongs to the group-common DRX cycle, the UE may wake up and monitor the group-common DRX active period 520 for potential sidelink resource scheduling and/or preemptions towards one or more of the services and/or device groups associated with the current group-common DRX cycle 515.

Figure 6:
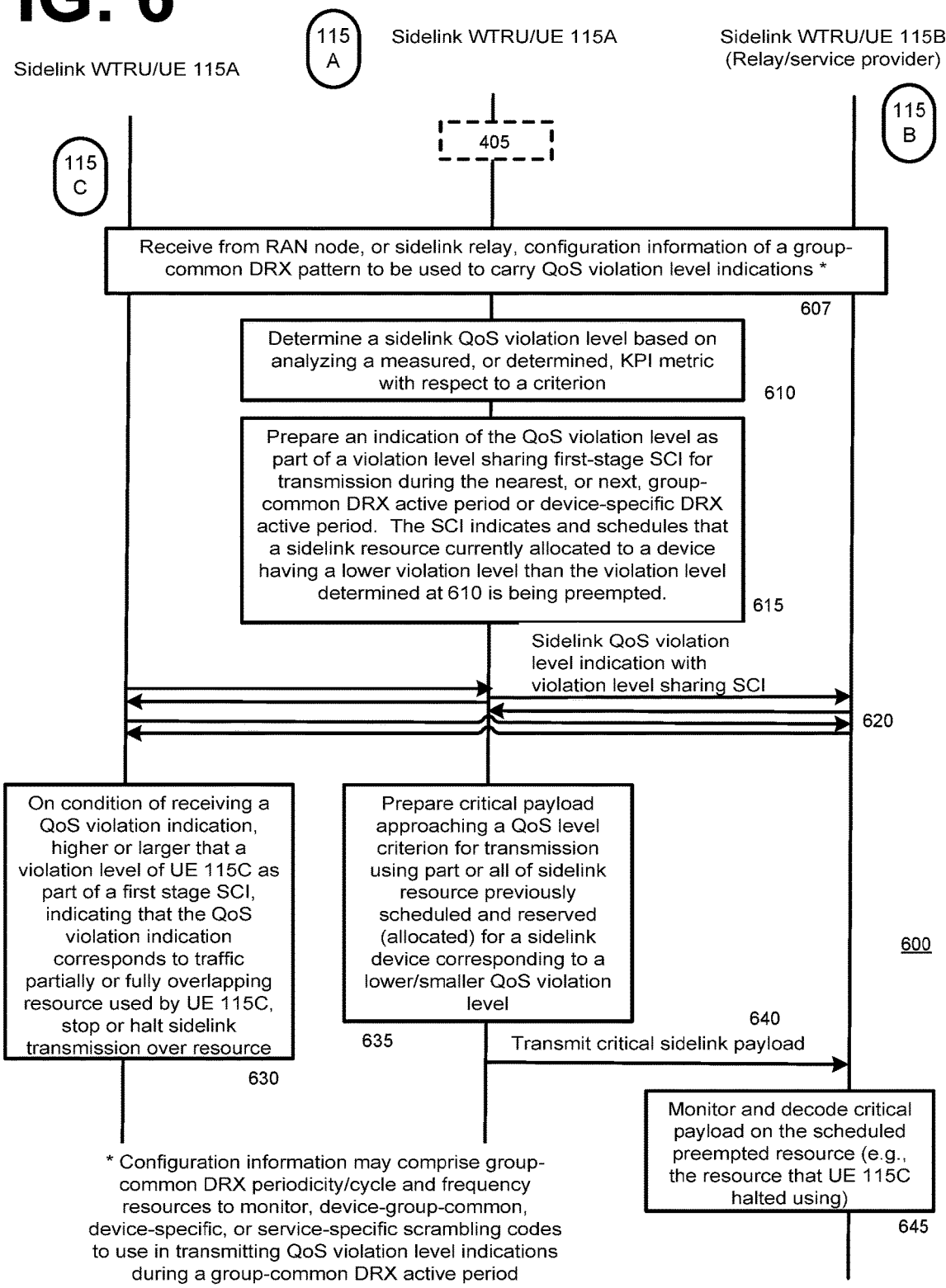
FIG. 6 illustrates a timing diagram of an example method that uses a group-common DRX active period to transmit QoS violation level indications.

Turning now to FIG. 6, the figure illustrates a timing diagram of an embodiment method 600 using a configured group-common DRX active period to possibly transmit QoS violation level indications among members of a sidelink group. Act 405 as described in reference to FIG. 4, may be performed to configure one or more UEs 115 with configuration information to implement real-time sidelink QoS adaptation as described in reference to FIGS. 2-4. At act 607 in FIG. 6, UE 115A, UE 115B, and UE 115C may receive from RAN node, or sidelink relay, configuration information of a group-common DRX pattern to be used to carry QoS violation level indications. Configuration information received at act 607 may comprise Configuration information may comprise group-common DRX periodicity/cycle and frequency resources to monitor, device-group-common, device-specific, or service-specific scrambling codes to use in transmitting QoS violation level indications during a group-common DRX active period. At act 610, UE 115A may determine a sidelink QoS violation level based on analyzing a measured, or determined, KPI metric with respect to a criterion, similar to the determination made at act 410 as described in reference to FIG. 4. At act 615 in FIG. 6, UE 115A may prepare an indication of the QoS violation level as part of a violation level sharing first-stage SCI for transmission during the nearest, or next, group-common DRX active period 520 or device-specific DRX active period 505-2, for example, as described in reference to FIG. 5. The SCI may indicate that a sidelink resource currently allocated to a device having a lower violation level that the violation level determined at act 610 is being preempted by UE 115A and the SCI may schedule the preemption of the resource. UE 115A may transmit the violation level indication in a violation level sharing first-stage SCI to UE 115C at act 620. It will be appreciated that UE 115B and UE 115C may also prepare respective violation level indications, based on their individual respective mapping 300, for transmission in a violation level sharing first stage SCI at act 615, but that act 615 is shown only for UE 115A for purposes of discussion. Act 620 is depicted with lines having arrows pointing from each UE 115 to the other UEs in the sidelink group to show that at act 620 the UEs of a sidelink group may share their respective violation level indications with each other. Thus, member devices of a sidelink group may be notified of violation levels of other members of the group.

At act 630, UE 115C may receive the first-stage SCI transmitted by UE 115A at act 620. After receiving the first-stage SCI, UE 115C may determine that an indication included in the violation level sharing first stage SCI indicates a violation level associated with a sidelink resource that UE 115C is scheduled to use, or that UE 115C may be using without being scheduled to use, that is higher than a violation level of a transmission that UE 115C may be performing using the same resource. If UE 115C makes such a determination that a violation level corresponding to the use that UE 115C is making of the resource is lower than the violation level received in the first-stage SCI transmitted by UE 115B at act 420, UE 115C may stop, or halt, using the resource.

At act 635, UE 115A may prepare the critical payload (e.g., packets that have been buffered at UE 115A an amount of time approaching a latency criterion associated with the packets) for transmission using the resource that UE 115C stopped, or halted, use of at act 630. At act 640 UE 115A may transmit buffered critical traffic payload packets to UE 115B using the resource that UE 115A 'overtook' from UE 115C based on the violation level at UE 115A corresponding to use of the sidelink resource for transmitting the buffered traffic packets being higher than the violation level for the same resource that UE 115C had been making use of before stopping, or halting, such use at act 630. UE 115B may monitor, decode, and process the traffic packets transmitted at act 640. (It will be appreciated that processing of the traffic packets at act 640 may comprise using the packets by an application at UE 115B, or may comprise forwarding/transmitting the packets to another member of the sidelink group.)

The sidelink channel preemption is shown to be beneficial sharing the sidelink resources for sidelink devices that are most latency stringent, (e.g., most closely approaching their respective QoS violation point). Thus, sidelink UEs carrying critical, latency-stringent traffic may be able to takeover active channel resources which were scheduled and allocated to ongoing other sidelink transmissions. UEs that have had their transmission resources preempted may not be able to identify that their respective active resources have been preempted by other ongoing sidelink transmission, (e.g., due to being not in proximity of preempting devices). Therefore, those devices may continue receiving and attempting to decode the preempting traffic. In case the preempting traffic is already received by a preempted device, the preempted devices mat determine that the decoding failure is due to poor channel conditions, (e.g., not due to the incurred traffic preemption), and accordingly, they may buffer received payload for future combining, leading to spreading the decoding error.

A novel sidelink preemption indication may be transmitted from the transmitting sidelink devices to victim receiving devices (e.g., devices that have had transmitting resources preempted) that have identified that part of, or all of, their active resource set is being preempted by more critical sidelink traffic. The sidelink preemption indication may be transmitted as part of a scheduling SCI over the control channel, as part of a preemption activation search space towards preempted devices, and/or using sidelink RRC connection signaling. The sidelink preemption indication may contain information regarding which resources have been preempted and are not available any longer for current transmissions by the preempted device. The preemption indication may indicate a new resource grant information that the preempted UE may use for future resource allocation, in case sidelink resources are available. The indication can be scrambled using the following options: scrambling of the sidelink preemption indication using a device-specific code. By decoding the sidelink preemption indication the device may identify its respective former resource grant has incurred partial or full preemption, and accordingly, the preempted device updates its resource allocation information. Another technique for scrambling the preemption indication may comprise scrambling of the sidelink preemption indication using a device-group-common code where devices that belong to certain configured device groups determine the presence of the preemption indication and correctly decode the preemption resource information. Accordingly, devices within a sidelink group, and which have an active resource allocation that overlaps partially or fully with the preemption resource information indicated in the preemption indication, determine that they have been preempted.

Based on determining the partial or full sidelink resource preemption, impacted receiving devices may skip receiving and skipping those preempted sidelink resources after having received a decoded the preemption indication. If the preemption indication is transmitted after receiving the preempted resources, the victim receiving device may flush its buffered payload corresponding to the preempted resources such that they do not spread the decoding error due to erroneous HARQ combining of the preempted traffic.

In an embodiment, on condition of having had part of, or all of, a previously allocated sidelink resources preempted, a sidelink WTRU/UE may receive a sidelink resource preemption indication during a next available configured group-common sidelink DRX cycle and/or device-specific DRX cycle including information on which sidelink resources are preempted and/or an updated scheduling information/grant. The preempted UE may either skip receiving to-be-preempted sidelink resources and/or flush its respective data buffer of payload received over the preempted sidelink resources.

Figure 7:
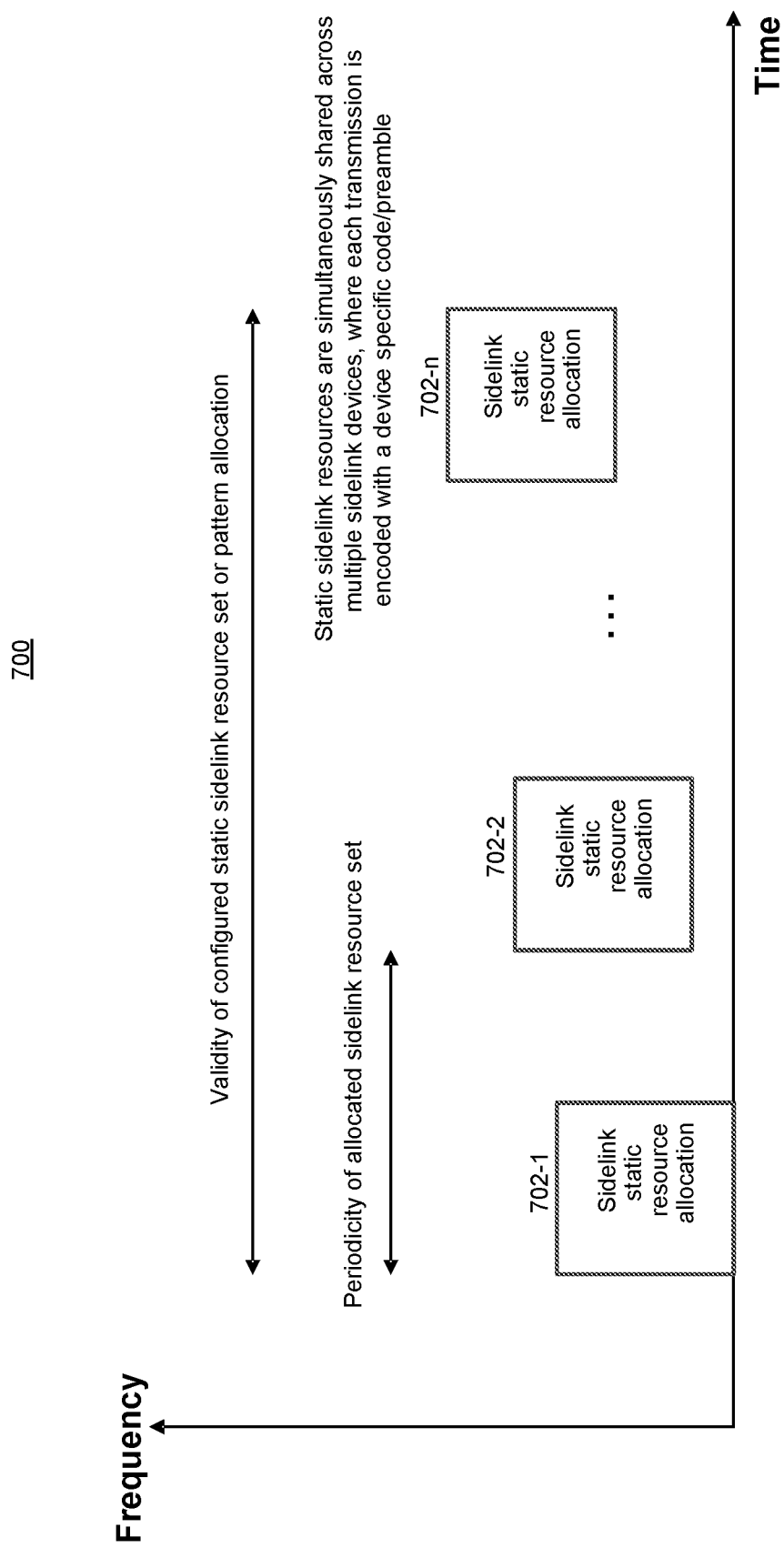
FIG. 7 illustrates a semi-static sidelink configured resource allocation example embodiment.

Turning now to FIG. 7, the figure illustrates a semi-static sidelink configured resource allocation example embodiment 700. Resource scheduling and allocation over a sidelink interface uses a preceding control channel transmission to transmit scheduling and resource information, and a data resource set where the actual payload is transmitted. This imposes a latency challenge against latency critical sidelink transmissions. Specifically, in addition to potential buffering delays in waiting until a next available control channel occasion, various sidelink devices may have various device-specific DRX cycles, and may only detect a subset of potentially available control channels, thus leading to delays before transmitting scheduling information to devices that will be receiving the data transmission. Furthermore, scheduling and allocation over a sidelink interface may assume that a receiving sidelink device is a sensing-capable device. Currently, non-sensing-capable devices cannot dynamically receive sidelink traffic.

A configured semi-static sidelink resource example embodiment 700 as depicted in FIG. 7 may facilitate grant-free sidelink transmissions, where sidelink data resources can be scheduled for data reception without a preceding scheduling control channel, thus, facilitating non-sensing-capable device in receiving data traffic. (Sensing-capable devices may also use a configured semi-static sidelink resource.) The term 'semi-static' may refer to a configured sidelink data resource that is available for member UEs of a sidelink group even if one or more of the members do not detect, sense, or otherwise access a control channel resource because the resource is available to a sidelink UE without being dynamically scheduled to the UE (thus 'static'), but may be 'deconfigured' if members of the group drop out of the group or if the group is terminated (thus 'semi'). A RAN network and/or sidelink service providers may configure latency-critical devices with one or more data resource patterns or sets 702-1-702-n, including the timing and frequency resources and periodicity of each resource pattern or set. The configuration information may include a device-specific preamble or scrambling code to be used for transmission of traffic flows that are destined towards the device of interest, in case resource sets 702-1-702-n are shared among various device pairs. Each sidelink device may be configured with an orthogonal transmission scrambling code for multi-device multiplexing. The semi-static sidelink resource configuration information may comprise a modulation scheme indication, a coding scheme indication, or a HARQ retransmission and combining mode indication.

Accordingly, sidelink devices, configured with grant-free sidelink resource sets 702-1-702-n, may attempt decoding the configured resource pattern or set, using the configured scrambling codes. Upon a failed reception and decoding of the data resources, a sidelink device may assume that there was not a transmission destined for itself. In case the reception failure is due to poor channel conditions, the transmitting sidelink device may blindly retransmit the payload during the next sidelink resource set occurrence 702. In this case, the receiving device does not apply any HARQ combining since it is not aware whether the first transmission was destined to it.

However, although always attempting to decode the configured sidelink resource patterns or sets 702-1-702-n by a sensing non-capable device potentially reduces end-to-end latency, poor battery power consumption performance typically results, which is especially undesirable and inefficient with infrequent traffic arrivals (e.g., when a device attempts decoding of a resource pattern or set 702 but there is not traffic in the resource 702 intended for the device).

Figure 8:
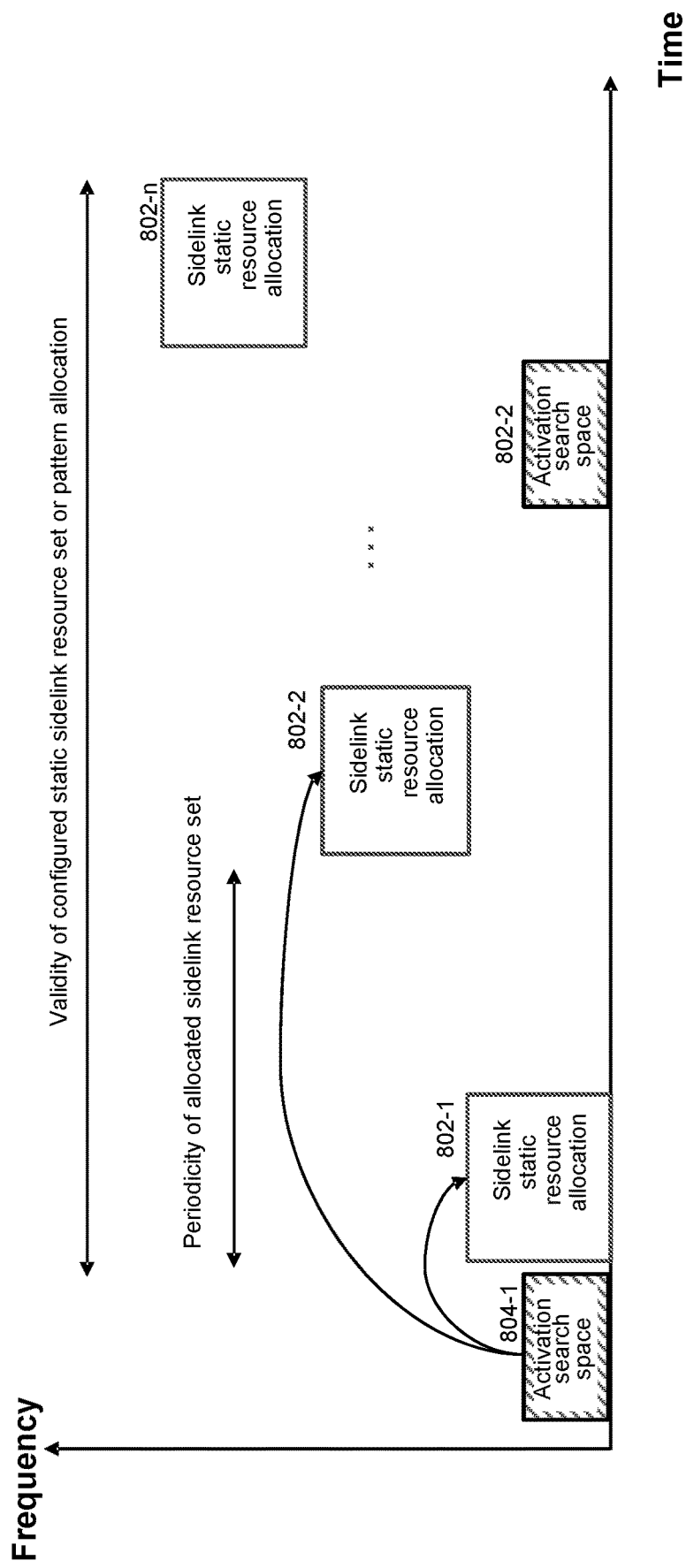
FIG. 8 illustrates a limited sidelink search space example embodiment.

Accordingly, as shown in FIG. 8, a limited sidelink search space 804 may be defined to potentially carry a resource set activation indication. The resource set activation indication implies an explicit signaling, in the form of a limited SCI and/or sequence, to indicate to a receiving device, for which grant-free resource patterns 802-1-802-n have been configured, of an imminent occurrence of a resource 802-1-802-n that contains traffic packets destined for the device.

As shown by FIG. 8, a transmitting sidelink device may transmit a grant-free resource activation indication in a sidelink search space 804, which may indicate that a corresponding resource 802 has been used for a current transmission to a particular UE. It will be appreciated that in an embodiment every resource 802 may be preceded by a corresponding sidelink search space 804. A receiving sidelink device may monitor and blindly decode the resource activation search space 804. For example, upon determining a present resource activation indication in a decoded search space 804-1, a sidelink device(s) may receive and decode respective resource set 802-1, using the defined/configured transmission configurations. Decoding a search space 804 may consume less processing resources of a UE and thus less battery resources of the UE than decoding a resource 802. Thus, the number of unnecessary decoding's of grant-free resources 802 is minimized, which in turn reduces battery power consumption of the sidelink device that would otherwise be wasted on decoding a grant-free resource 802 just to determine that there is no traffic intended for the device. Furthermore, a resource activation indication in sidelink search space 804 can be scrambled by device-specific, group-specific or service-specific scrambling codes and/or preambles. This allows for limiting the size of search space 804, and may reduce the unnecessary device decoding of the grant-free resource 802, when the transmitted data is not destined for those devices.

In an embodiment, sidelink WTRU/UEs receive, from a RAN node and/or sidelink relays, sidelink configurations of data resources, such as resources 702 described in reference to FIG. 7, for immediate and grant-free critical sidelink transmissions including preconfigured sidelink data transmission configurations (default modulation and coding, default retransmission HARQ type), device-specific data preamble for data encapsulation, and timing/frequency resources and periodicity of the indicated resource set. A configured sidelink UE may receive and decode the payload transmitted over the configured static data resource set 702, based on signaled predefined transmission configurations including the device-specific preamble, and without the need for a preceding sidelink control information monitoring and detection, (e.g., according to a grant-free sidelink resource configuration.) A resource occasion 702 as shown in FIG. 7, or a resource occasion 802 as shown in FIG. 8 may be referred to as semi-static sidelink resource.

Figure 9:
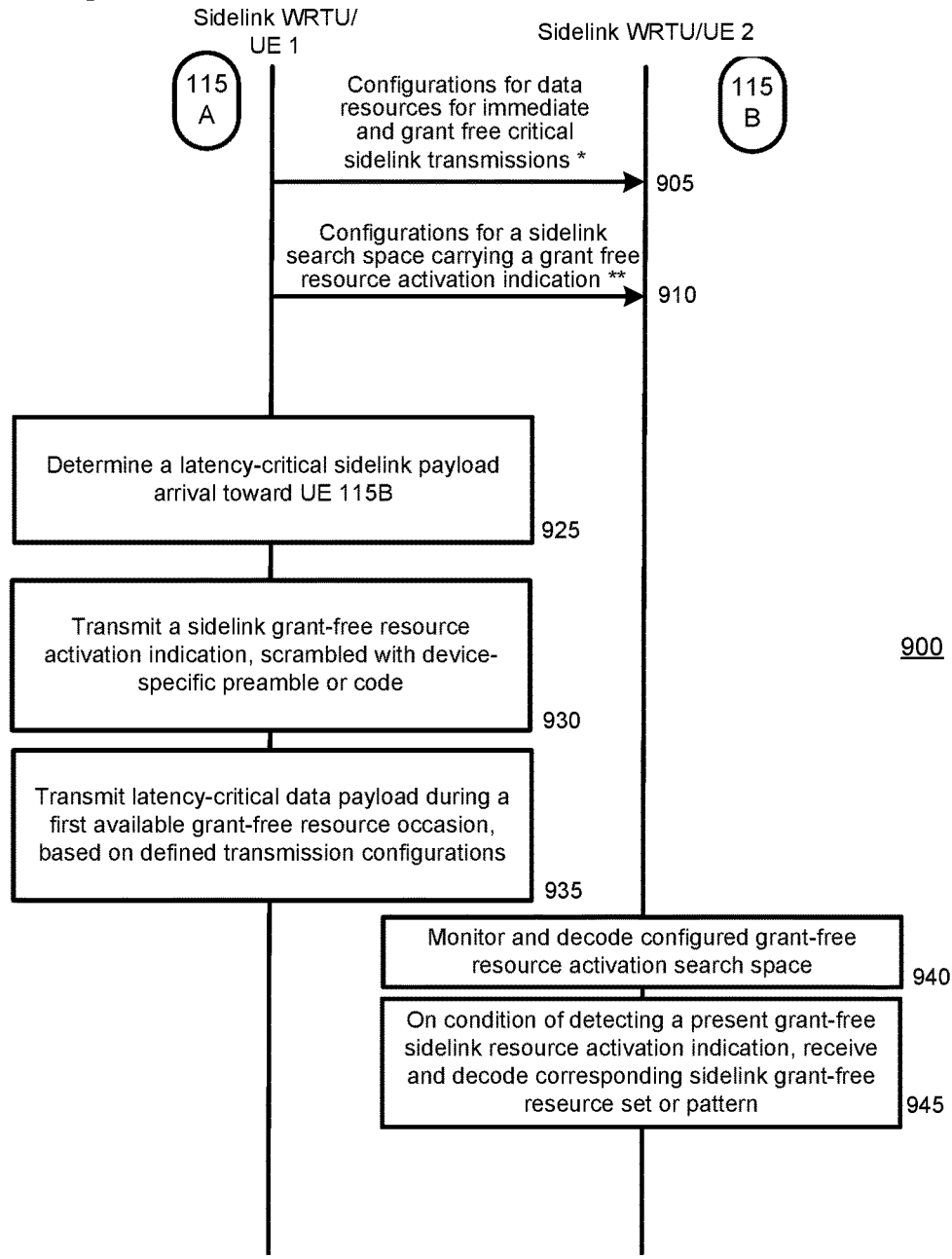
FIG. 9 illustrates a timing diagram of a semi-static grant-free sidelink resource allocation example method.

Turning now to FIG. 9, the figure illustrates a timing diagram of a semi-static grant-free sidelink resource allocation example method 900. Sidelink WTRU/UEs receive at act 905, from a RAN node and/or sidelink relays, sidelink configurations of data resources for immediate and grant-free critical sidelink transmissions. The configurations may include preconfigured sidelink data transmission configurations (default modulation and coding, default retransmission HARQ type), device-specific data preamble for data encapsulation, and timing/frequency resources and periodicity of the indicated resource set, such as resource sets 702 described in reference to FIG. 7, or resource sets 802 described in reference to FIG. 8. A UE may receive at act 910 configurations of a sidelink search space, such as a search spaces 804 described in reference to FIG. 8, that may carry a grant-free resource activation indication and corresponding channel timing and frequency resources, scrambling codes to be transmitted over the sidelink search space (which codes may be sidelink service-specific, device-specific, device-group-common-specific). UE 115A may determine at act 925 that it has received latency-critical payload data destined for UE 115B that UE 115A should forward to UE 115B. At act 930 UE 115A transmits to UE 115B activation indication, scrambled with a device specific preamble or code, in a sidelink search space, for example search space 804-1 shown in FIG. 8. At act 935 in FIG. 9 UE 115A transmits to UA 115B latency-critical payload data in a first available grant-free resource, such as resource 802-1 shown in FIG. 8. At act 940 UE 115B monitors and decodes configured grant-free resource activation indication search space 804-1. At act 945, on condition of determining that a grant-free resource activation indication in search space 804-1 indicates that an imminent data payload intended for UE 115B will be forthcoming in grant-free resource 802-1, UE-115B may receive and decode from resource 802-1 the latency-critical data payload that was transmitted at act 935. UE 115B may perform monitoring and decoding of configured search space 804-1, which may a grant-free resource activation indication, based on configured scrambling codes. UE 115B may receive and decode the payload transmitted over the determined active grant-free data resource set 802-1 at act 935 based on signaled predefined transmission configurations including a device-specific preamble, and without the need for a preceding sidelink control information monitoring and detection, (e.g., decode grant free sidelink resource reception according to a grant-free sidelink resource configuration).

Figure 10:
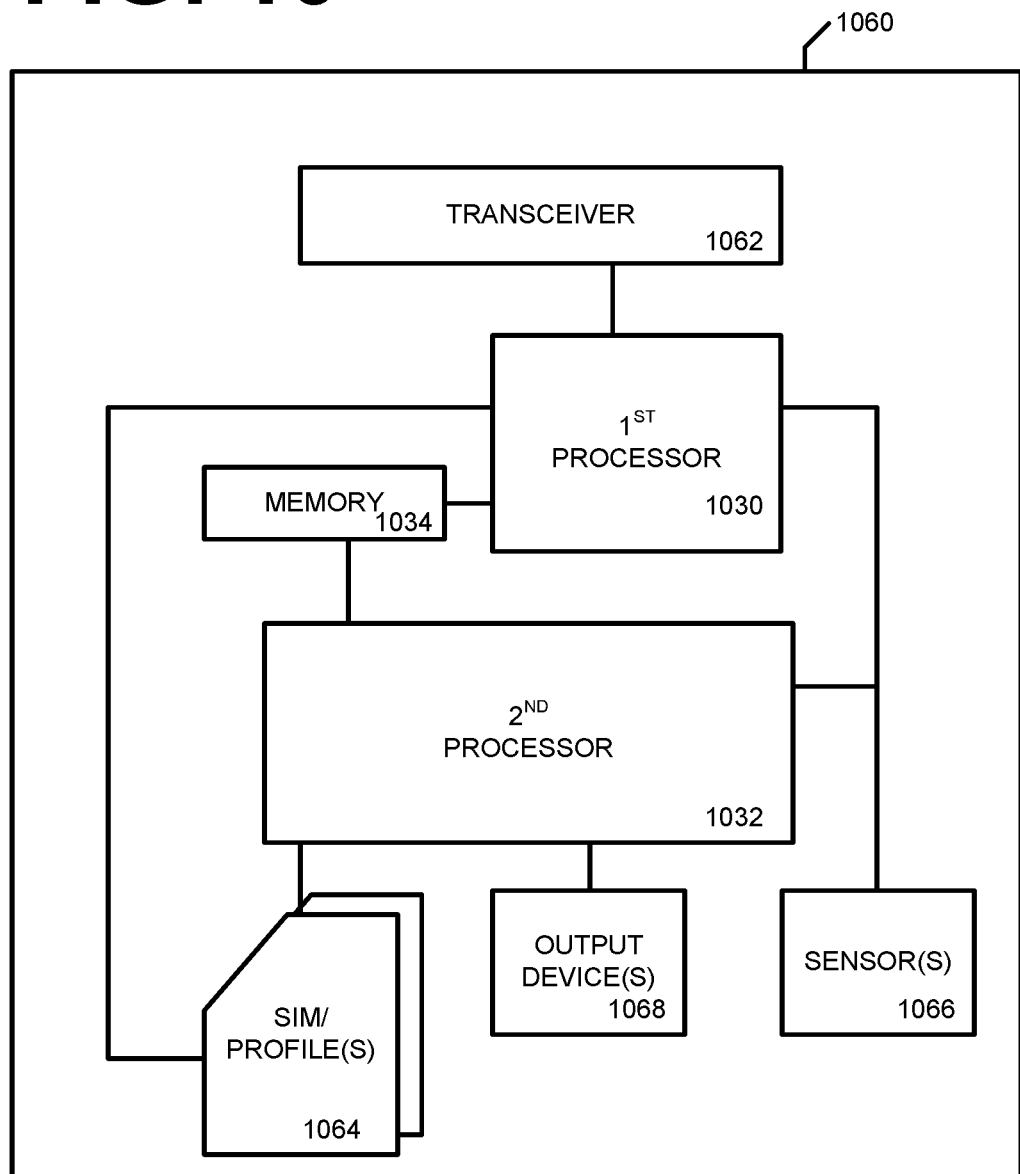
FIG. 10 illustrates a block diagram of an example wireless UE.

Turning now to FIG. 10, the figure illustrates a block diagram of an example UE 1060. UE 1060 may comprise a smart phone, a wireless tablet, a laptop computer with wireless capability, a wearable device, a machine device that may facilitate vehicle telematics, and the like. UE 1060 comprises a first processor 1030, a second processor 1032, and a shared memory 1034. UE 1060 includes radio front end circuitry 1062, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1062 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 10, UE 1060 may also include a SIM 1064, or a SIM profile, which may comprise information stored in a memory (memory 34 or a separate memory portion), for facilitating wireless communication with RAN 105 or core network 130 shown in FIG. 1. FIG. 10 shows SIM 1064 as a single component in the shape of a conventional SIM card, but it will be appreciated that SIM 1064 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1064 and another device, which may be a component of RAN 105 or core network 130 shown in FIG. 1). A SIM profile 1064 may also comprise identifying information that is unique to the SIM, or SIM profile, such as, for example, an International Mobile Subscriber Identity ("IMSI") or information that may make up an IMSI.

SIM 1064 is shown coupled to both the first processor portion 1030 and the second processor portion 1032. Such an implementation may provide an advantage that first processor portion 30 may not need to request or receive information or data from SIM 1064 that second processor 1032 may request, thus eliminating the use of the first processor acting as a 'go-between' when the second processor uses information from the SIM in performing its functions and in executing applications. First processor 1030, which may be a modem processor or baseband processor, is shown smaller than processor 1032, which may be a more sophisticated application processor, to visually indicate the relative levels of sophistication (i.e., processing capability and performance) and corresponding relative levels of operating power consumption levels between the two processor portions. Keeping the second processor portion 1032 asleep/inactive/in a low power state when UE 1060 does not need it for executing applications and processing data related to an application provides an advantage of reducing power consumption when the UE only needs to use the first processor portion 1030 while in listening mode for monitoring routine configured bearer management and mobility management/maintenance procedures, or for monitoring search spaces that the UE has been configured to monitor while the second processor portion remains inactive/asleep.

UE 1060 may also include sensors 1066, such as, for example, temperature sensors, accelerometers, gyroscopes, barometers, moisture sensors, and the like that may provide signals to the first processor 1030 or second processor 1032. Output devices 1068 may comprise, for example, one or more visual displays (e.g., computer monitors, VR appliances, and the like), acoustic transducers, such as speakers or microphones, vibration components, and the like. Output devices 1068 may comprise software that interfaces with output devices, for example, visual displays, speakers, microphones, touch sensation devices, smell or taste devices, and the like, that are external to UE 1060.

Figure 11:
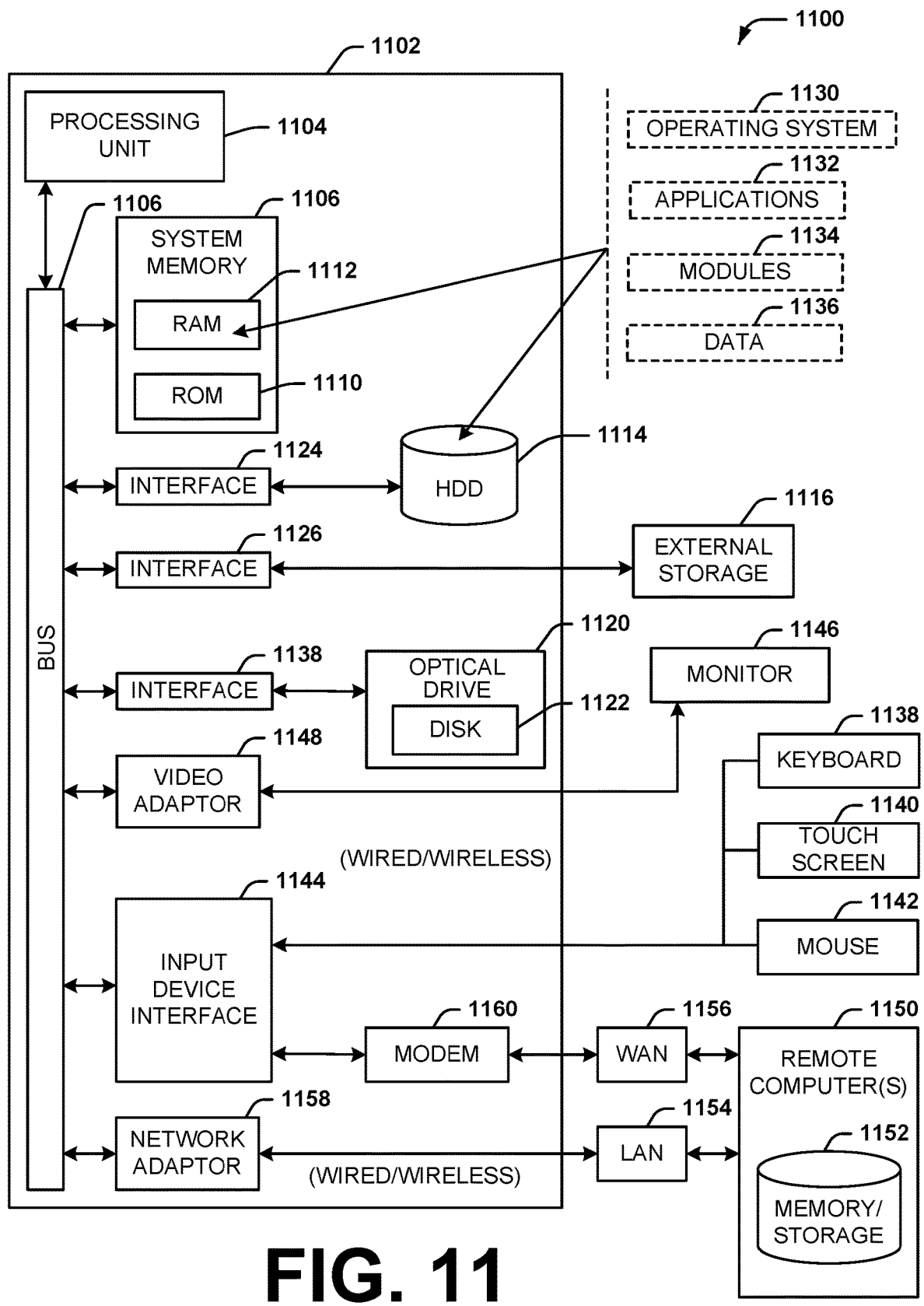
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
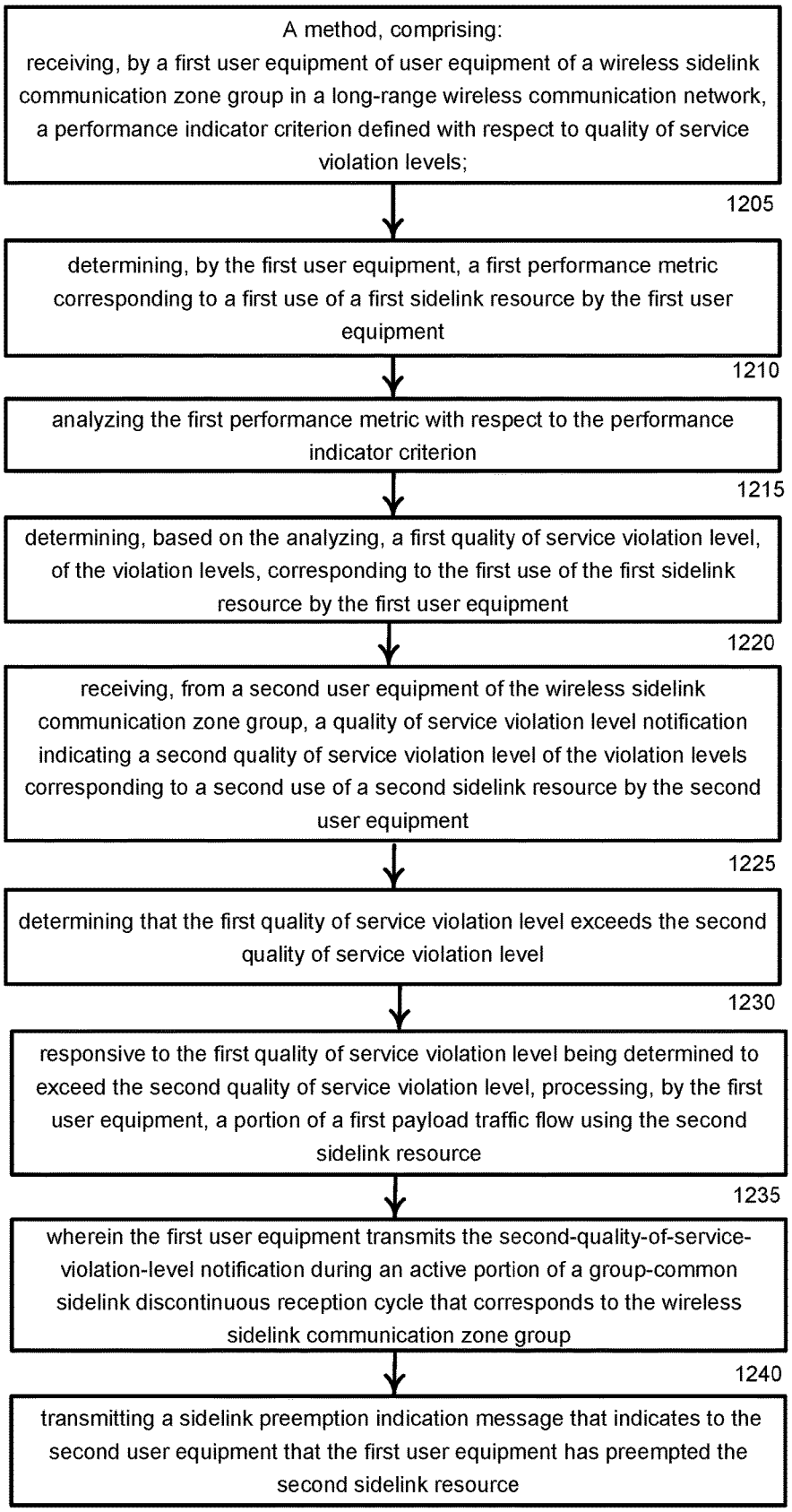
FIG. 12 illustrates a block diagram of an example method.

Turning now to FIG. 12, the figure illustrates an example embodiment method 1200 comprising at block 1205 receiving, by a first user equipment of user equipment of a wireless sidelink communication zone group in a long-range wireless communication network, a performance indicator criterion defined with respect to quality of service violation levels; at block 1210 determining, by the first user equipment, a first performance metric corresponding to a first use of a first sidelink resource by the first user equipment; at block 1215 analyzing the first performance metric with respect to the performance indicator criterion; at block 1220 determining, based on the analyzing, a first quality of service violation level, of the violation levels, corresponding to the first use of the first sidelink resource by the first user equipment; at block 1225 receiving, from a second user equipment of the wireless sidelink communication zone group, a quality of service violation level notification indicating a second quality of service violation level of the violation levels corresponding to a second use of a second sidelink resource by the second user equipment; at block 1230 determining that the first quality of service violation level exceeds the second quality of service violation level; at block 1235 responsive to the first quality of service violation level being determined to exceed the second quality of service violation level, processing, by the first user equipment, a first portion of a payload traffic flow using the second sidelink resource; at block 1240 wherein the first user equipment transmits the second-quality-of-service-violation-level notification during an active portion of a group-common sidelink discontinuous reception cycle that corresponds to the wireless sidelink communication zone group; and at block 1245 transmitting a sidelink preemption indication message that indicates to the second user equipment that the first user equipment has preempted the second sidelink resource.

Figure 13:
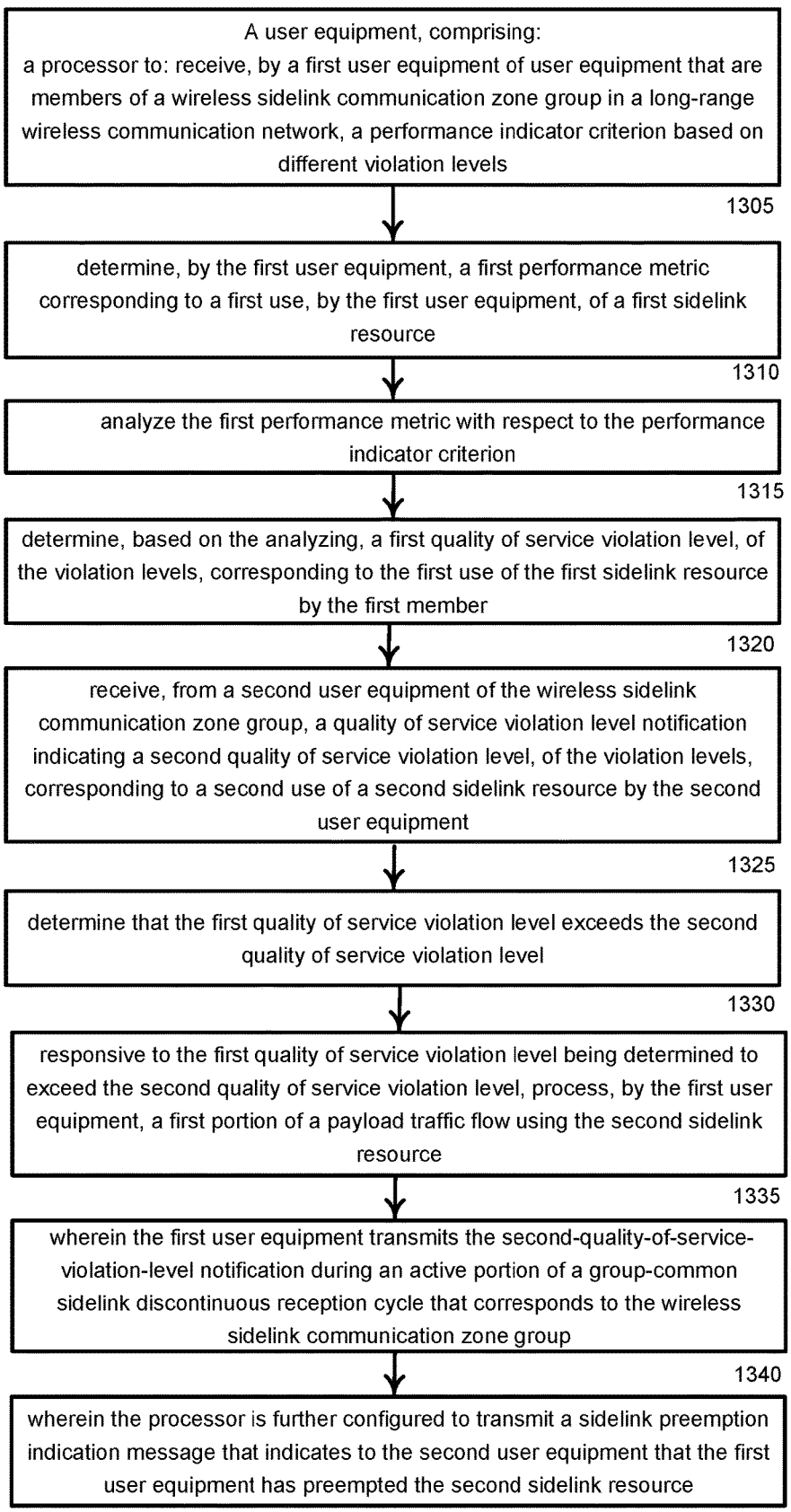
FIG. 13 illustrates a block diagram of an example user equipment.

Turning now to FIG. 13, the figure illustrates an example user equipment 1300 comprising at step 1305 a processor to: receive, by a first user equipment of user equipment that are members of a wireless sidelink communication zone group in a long-range wireless communication network, a performance indicator criterion based on different violation levels; at block 1310 determine, by the first user equipment, a first performance metric corresponding to a first use, by the first user equipment, of a first sidelink resource; at block 1315 analyze the first performance metric with respect to the performance indicator criterion; at block 1320 determine, based on the analyzing, a first quality of service violation level, of the violation levels, corresponding to the first use of the first sidelink resource by the first member; at block 1325 receive, from a second user equipment of the wireless sidelink communication zone group, a quality of service violation level notification indicating a second quality of service violation level, of the violation levels, corresponding to a second use of a second sidelink resource by the second user equipment; at block 1330 determine that the first quality of service violation level exceeds the second quality of service violation level; at block 1335 responsive to the first quality of service violation level being determined to exceed the second quality of service violation level, process, by the first user equipment, a first portion of a payload traffic flow using the second sidelink resource; at block 1340 wherein the first user equipment transmits the second-quality-of-service-violation-level notification during an active portion of a group-common sidelink discontinuous reception cycle that corresponds to the wireless sidelink communication zone group; and at block 1345 wherein the processor is further configured to transmit a sidelink preemption indication message that indicates to the second user equipment that the first user equipment has preempted the second sidelink resource.

Turning now to FIG. 14, the figure illustrates a non-transitory machine-readable medium 1400 comprising at block 1405 executable instructions that, when executed by a processor of a first member of user equipment members of a wireless sidelink communication zone group in a long-range wireless communication network, facilitate performance of operations, comprising: receiving, by the first member, a performance indicator criterion comprising a group of violation levels; at block 1410 determining, by the first member, a first performance metric corresponding to a first use by the first user equipment of a sidelink resource; at block 1415 analyzing the first performance metric with respect to the performance indicator criterion; at block 1420 determining, based on the analyzing, a first quality of service violation level, of the violation levels, corresponding to the first use of the sidelink resource by the first member; at block 1425 receiving, from a second member of the wireless sidelink communication zone group, a quality of service violation level notification indicating a second quality of service violation level, of the violation levels, corresponding to a second use of the sidelink resource by the second member; at block 1430 determining that the first quality of service violation level exceeds the second quality of service violation level; at block 1435 responsive to the first quality of service violation level being determined to exceed the second quality of service violation level, processing, by the first member, a first portion of a payload traffic flow using the sidelink resource; at block 1440 wherein the first member transmits the second-quality-of-service-violation-level notification during an active portion of a group-common sidelink discontinuous reception cycle that corresponds to the wireless sidelink communication zone group; and at block 1445 wherein the operations further comprise transmitting a sidelink preemption indication message that indicates to the second member that the first member has preempted the second sidelink resource.

Turning now to FIG. 15, the figure illustrates an example embodiment method 1500 comprising at block 1505 receiving, by a first user equipment of user equipment of a wireless sidelink communication zone group in a long-range wireless communication network, semi-static sidelink data resource configuration information that configures the first user equipment to obtain data from a semi-static sidelink data resource; at block 1510 monitoring the semi-static sidelink data resource according to the configured semi-static sidelink data resource configuration information; at block 1515 decoding the semi-static sidelink data resource according to the configured semi-static sidelink data resource configuration information to result in a decoded semi-static sidelink data resource; at block 1520 determining that the decoded semi-static sidelink data resource comprises a portion of a payload traffic flow destined for the first user equipment; at block 1525 retrieving the portion of a payload traffic flow destined from the decoded semi-static sidelink data resource; at block 1530 processing, by the first user equipment, the portion of the payload traffic destined for the first user equipment; at block 1535 wherein the semi-static sidelink data resource configuration information comprises a device-specific scrambling code for use by the first user equipment to decode the semi-static sidelink data resource; and at block 1540 wherein the device-specific scrambling code comprises an orthogonal transmission scrambling code.

Figure 16:
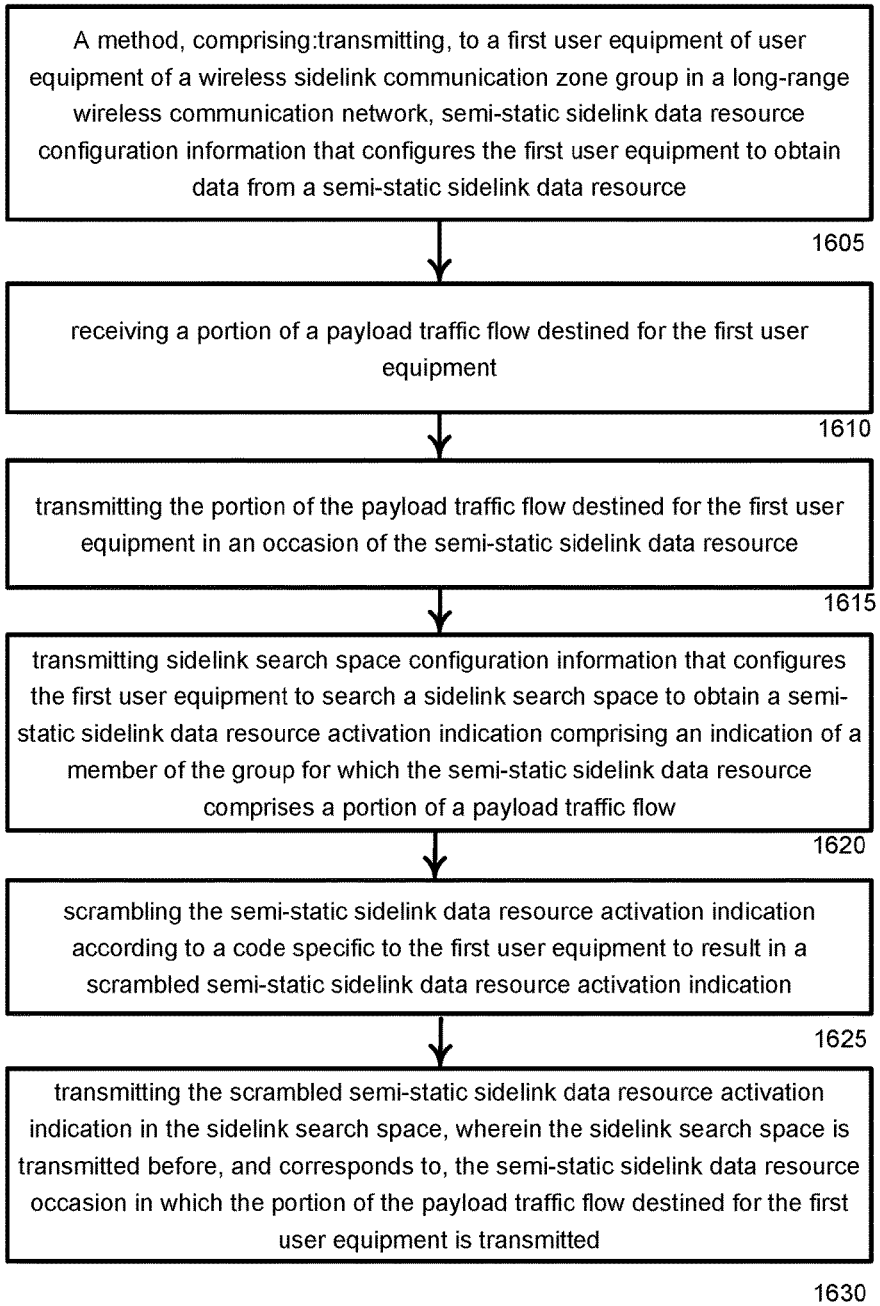
FIG. 16 illustrates a block diagram of an example method.

Turning now to FIG. 16, the figure illustrates an example embodiment method 1600 comprising at block 1605 transmitting, to a first user equipment of user equipment of a wireless sidelink communication zone group in a long-range wireless communication network, semi-static sidelink data resource configuration information that configures the first user equipment to obtain data from a semi-static sidelink data resource; at block 1610 receiving a portion of a payload traffic flow destined for the first user equipment; at block 1615 transmitting the portion of the payload traffic flow destined for the first user equipment in an occasion of the semi-static sidelink data resource; at block 1620 transmitting sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; at block 1625 scrambling the semi-static sidelink data resource activation indication according to a code specific to the first user equipment to result in a scrambled semi-static sidelink data resource activation indication; and at block 1630 transmitting the scrambled semi-static sidelink data resource activation indication in the sidelink search space, wherein the sidelink search space is transmitted before, and corresponds to, the semi-static sidelink data resource occasion in which the portion of the payload traffic flow destined for the first user equipment is transmitted.

Figure 17:
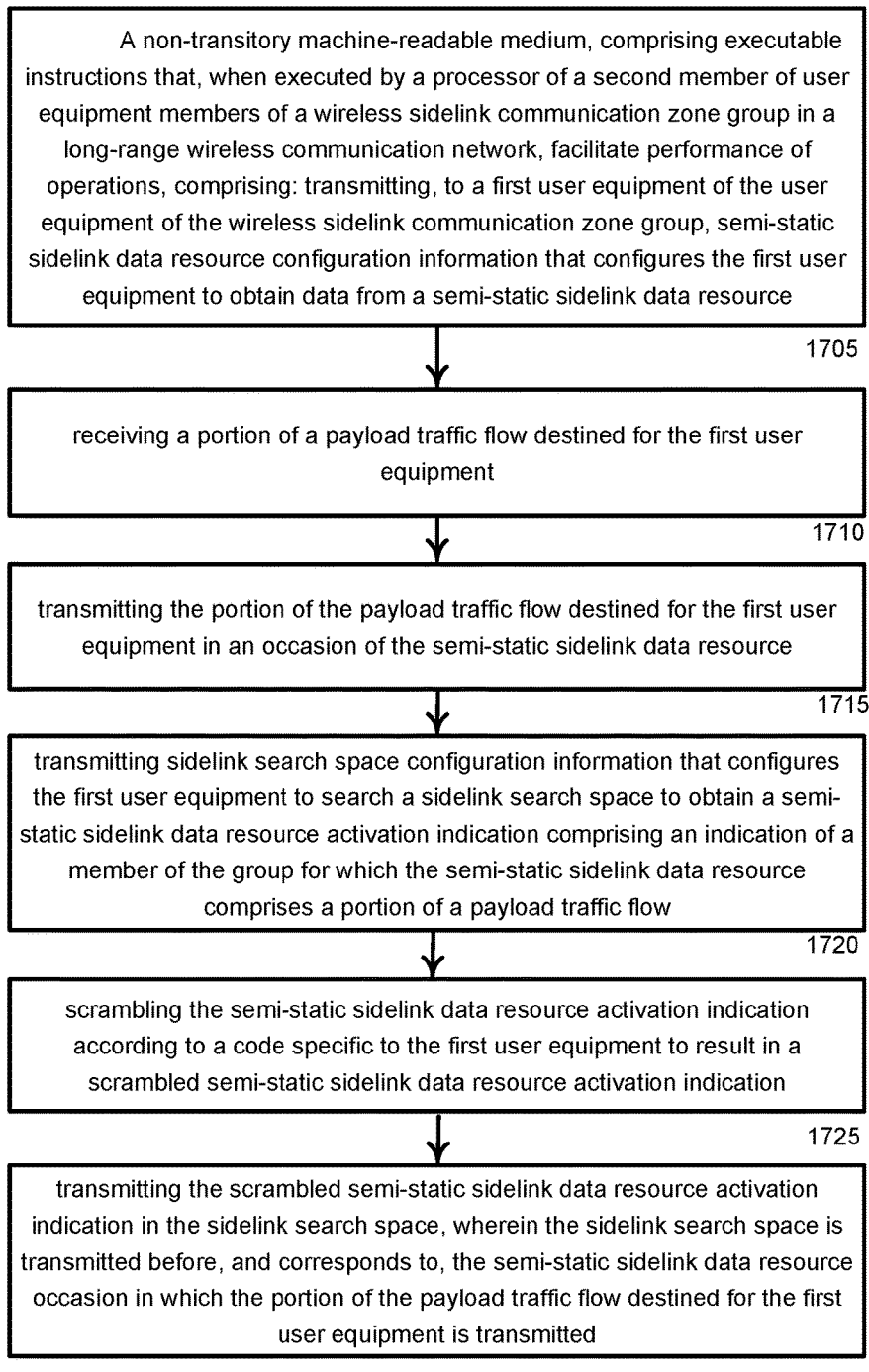
FIG. 17 illustrates a block diagram of an example non-transitory machine-readable medium embodiment.

Turning now to FIG. 17, the figure illustrates a non-transitory machine-readable medium 1700 comprising at block 1705 executable instructions that, when executed by a processor of a second member of user equipment members of a wireless sidelink communication zone group in a long-range wireless communication network, facilitate performance of operations, comprising: transmitting, to a first user equipment of the user equipment of the wireless sidelink communication zone group, semi-static sidelink data resource configuration information that configures the first user equipment to obtain data from a semi-static sidelink data resource; at block 1710 receiving a portion of a payload traffic flow destined for the first user equipment; at step 1715 transmitting the portion of the payload traffic flow destined for the first user equipment in an occasion of the semi-static sidelink data resource; at block 1720 transmitting sidelink search space configuration information that configures the first user equipment to search a sidelink search space to obtain a semi-static sidelink data resource activation indication comprising an indication of a member of the group for which the semi-static sidelink data resource comprises a portion of a payload traffic flow; at block 1725 scrambling the semi-static sidelink data resource activation indication according to a code specific to the first user equipment to result in a scrambled semi-static sidelink data resource activation indication; and at block 1730 transmitting the scrambled semi-static sidelink data resource activation indication in the sidelink search space, wherein the sidelink search space is transmitted before, and corresponds to, the semi-static sidelink data resource occasion in which the portion of the payload traffic flow destined for the first user equipment is transmitted.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive —in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  receiving, by a first user equipment of user equipment of a wireless sidelink communication zone group in a long-range wireless communication network, a performance indicator criterion defined with respect to quality of service violation levels;
  determining, by the first user equipment, a first performance metric corresponding to a first use of a first sidelink resource by the first user equipment;
  analyzing the first performance metric with respect to the performance indicator criterion;
  determining, based on the analyzing, a first quality of service violation level, of the violation levels, corresponding to the first use of the first sidelink resource by the first user equipment;
  receiving, from a second user equipment of the wireless sidelink communication zone group, a quality of service violation level notification indicating a second quality of service violation level of the violation levels corresponding to a second use of a second sidelink resource by the second user equipment;
  determining that the first quality of service violation level exceeds the second quality of service violation level;

responsive to the first quality of service violation level being determined to exceed the second quality of service violation level, processing, by the first user equipment, a portion of a first payload traffic flow using the second sidelink resource; and transmitting, by the first user equipment, the second quality of service violation level notification during an active portion of a group-common sidelink discontinuous reception cycle that corresponds to the wireless sidelink communication zone group, wherein a group-common sidelink discontinuous reception cycle configuration that corresponds to the group-common sidelink discontinuous reception cycle comprises service-specific scrambling codes associated with group-common sidelink discontinuous reception cycle resources that are service-specific, and wherein the service-specific scrambling codes are used to encode the second quality of service level notification.

2. The method of claim 1, wherein the first sidelink resource and the second sidelink resource comprise the same sidelink resource.

3. The method of claim 1, wherein a group-common sidelink discontinuous reception cycle configuration that corresponds to the group-common sidelink discontinuous reception cycle comprises device-specific scrambling codes associated with group-common sidelink discontinuous reception cycle resources that are device-specific, and wherein the device-specific scrambling codes are used to encode the second-quality-of-service-violation-level notification.

4. The method of claim 1, further comprising:
transmitting to a third user equipment in a sidelink search space a sidelink activation message comprising an indication of a configured third sidelink resource; and
transmitting to the third user equipment a portion of a second payload traffic flow in the third sidelink resource.

5. The method of claim 1, further comprising transmitting a sidelink preemption indication message that indicates to the second user equipment that the first user equipment has preempted the second sidelink resource.

6. The method of claim 5, wherein the sidelink preemption message is scrambled according to a device-specific scrambling code of the device-specific scrambling codes corresponding to the second user equipment.

7. The method of claim 5, wherein the sidelink preemption message is scrambled according to a scrambling code corresponding to the wireless sidelink communication zone group.

8. A user equipment, comprising:
a processor to:
receive, by a first user equipment of user equipment that are members of a wireless sidelink communication zone group in a long-range wireless communication network, a performance indicator criterion based on different violation levels;
determine, by the first user equipment, a first performance metric corresponding to a first use, by the first user equipment, of a first sidelink resource;
analyze the first performance metric with respect to the performance indicator criterion;
determine, based on the analyzing, a first quality of service violation level, of the violation levels, corresponding to the first use of the first sidelink resource by the first member;
receive, from a second user equipment of the wireless sidelink communication zone group, a quality of service violation level notification indicating a second quality of service violation level, of the violation levels, corresponding to a second use of a second sidelink resource by the second user equipment;
determine that the first quality of service violation level exceeds the second quality of service violation level;
responsive to the first quality of service violation level being determined to exceed the second quality of service violation level, process, by the first user equipment, a portion of a first payload traffic flow using the second sidelink resource;
monitor a sidelink search space, wherein the sidelink search space comprises a sidelink activation message received from a third user equipment of the wireless sidelink communication zone group, the sidelink activation message comprising an indication of a third sidelink resource containing data traffic intended for the first user equipment;
decode, by the first user equipment, the sidelink search space to result in a decoded indication of the third sidelink resource; and
process, by the first user equipment, a portion of a second payload traffic flow from the third sidelink resource.

9. The user equipment of claim 8, wherein the first sidelink resource and the second sidelink resource comprise the same sidelink resource.

10. The user equipment of claim 8, wherein the first user equipment transmits the second-quality-of-service-violation-level notification during an active portion of a group-common sidelink discontinuous reception cycle that corresponds to the wireless sidelink communication zone group.

11. The user equipment of claim 10, wherein a group-common sidelink discontinuous reception cycle configuration that corresponds to the group-common sidelink discontinuous reception cycle comprises service-specific scrambling codes associated with group-common sidelink discontinuous reception cycle resources that are service-specific, and wherein the service-specific scrambling codes are used to encode the second-quality-of-service-level notification.

12. The user equipment of claim 10, wherein a group-common sidelink discontinuous reception cycle configuration that corresponds to the group-common sidelink discontinuous reception cycle comprises device-specific scrambling codes associated with group-common sidelink discontinuous reception cycle resources that are device-specific, and wherein the device-specific scrambling codes are used to encode the second-quality-of-service-violation-level notification.

13. The user equipment of claim 8, wherein the processor is further configured to transmit a sidelink preemption indication message that indicates to the second user equipment that the first user equipment has preempted the second sidelink resource.

14. A non-transitory machine-readable medium, comprising executable instructions that, when executed by at least one processor of a first member of user equipment members of a wireless sidelink communication zone group in a long-range wireless communication network, facilitate performance of operations, comprising:
receiving, by the first member, a performance indicator criterion comprising a group of violation levels;
determining, by the first member, a first performance metric corresponding to a first use by the first user equipment of a sidelink resource;

analyzing the first performance metric with respect to the performance indicator criterion;

determining, based on the analyzing, a first quality of service violation level, of the violation levels, corresponding to the first use of the sidelink resource by the first member;

receiving, from a second member of the wireless sidelink communication zone group, a quality of service violation level notification indicating a second quality of service violation level, of the violation levels, corresponding to a second use of the sidelink resource by the second member;

determining that the first quality of service violation level exceeds the second quality of service violation level; and responsive to the first quality of service violation level being determined to exceed the second quality of service violation level, processing, by the first member, a portion of a payload traffic flow using the sidelink resource;

monitoring a sidelink search space, wherein the sidelink search space comprises a sidelink activation message received from a third member of the wireless sidelink communication zone group, the sidelink activation message comprising an indication of a third sidelink resource carrying data traffic of a second payload traffic flow destined for the first member;

decoding, by the first member, the sidelink search space to result in a decoded indication of the third sidelink resource; and processing, by the first member, a portion of the second payload traffic flow according to the decoded indication of the third sidelink resource.

15. The non-transitory machine-readable medium of claim 14, wherein the first member transmits the second-quality-of-service-violation-level notification during an active portion of a group-common sidelink discontinuous reception cycle that corresponds to the wireless sidelink communication zone group.

16. The non-transitory machine-readable medium of claim 14, wherein the operations further comprise transmitting a sidelink preemption indication message that indicates to the second member that the first member has preempted the second sidelink resource.

17. The method of claim 1, wherein the first performance metric is a first latency, and wherein the second performance metric is a second latency.

18. The method of claim 17, wherein the first latency is lower than the second latency.

19. The non-transitory machine-readable medium of claim 14, wherein the first user equipment transmits the second-quality-of-service-violation-level notification during an active portion of a group-common sidelink discontinuous reception cycle that corresponds to the wireless sidelink communication zone group, wherein a group-common sidelink discontinuous reception cycle configuration that corresponds to the group-common sidelink discontinuous reception cycle comprises service-specific scrambling codes associated with group-common sidelink discontinuous reception cycle resources that are service-specific, and wherein the service-specific scrambling codes are used to encode the second-quality-of-service-level notification.

20. The non-transitory machine-readable medium of claim 14, wherein the first user equipment transmits the second-quality-of-service-violation-level notification during an active portion of a group-common sidelink discontinuous reception cycle that corresponds to the wireless sidelink communication zone group, wherein a group-common sidelink discontinuous reception cycle configuration that corresponds to the group-common sidelink discontinuous reception cycle comprises device-specific scrambling codes associated with group-common sidelink discontinuous reception cycle resources that are device-specific, and wherein the device-specific scrambling codes are used to encode the second-quality-of-service-violation-level notification.

* * * * *